US012585381B2

(12) United States Patent
Gnedin

(10) Patent No.: US 12,585,381 B2
(45) Date of Patent: Mar. 24, 2026

(54) ADVANCED KEYBOARD BASED SEARCH

(71) Applicant: HyperKey, Inc., Menlo Park, CA (US)

(72) Inventor: Nikita Gnedin, Los Angeles, CA (US)

(73) Assignee: Hyperkey, Inc.

( * ) Notice: Subject to any disclaimer, the term of this patent is extended or adjusted under 35 U.S.C. 154(b) by 0 days.

(21) Appl. No.: 16/944,120

(22) Filed: Jul. 30, 2020

(65) Prior Publication Data

US 2020/0363949 A1 Nov. 19, 2020

Related U.S. Application Data

(63) Continuation-in-part of application No. PCT/US2020/029175, filed on Apr. 21, 2020, and a
(Continued)

(51) Int. Cl.
 *G06F 3/04886* (2022.01)
 *G06F 3/041* (2006.01)
 (Continued)

(52) U.S. Cl.
 CPC ........ *G06F 3/04886* (2013.01); *G06F 3/0412* (2013.01); *G06F 3/0416* (2013.01);
 (Continued)

(58) Field of Classification Search
 CPC .. G06F 3/04886; G06F 3/0237; G06F 3/0481; G06F 3/04817; G06F 3/0482;
 (Continued)

(56) References Cited

U.S. PATENT DOCUMENTS 8,484,573 B1 7/2013 Zhai et al.
9,015,616 B2 * 4/2015 Tseng ..................... G06F 9/451
 345/169
(Continued)

FOREIGN PATENT DOCUMENTS

CN 102339437 A 2/2012

OTHER PUBLICATIONS

Yang Li. 2010. Gesture search: a tool for fast mobile data access. In Proceedings of the 23nd annual ACM symposium on User interface software and technology (UIST '10). Association for Computing Machinery, New York, NY, USA, 87-96. https://doi.org/10.1145/1866029.1866044 (Year: 2010).*
(Continued)

*Primary Examiner* — Andrew L Tank

(57) ABSTRACT

A virtual keyboard includes shortcut keys configured to execute a plurality of third-party applications from within the keyboard. These third-party applications are optionally executed via calls to a remote Application User Interface (API). The virtual keyboard optionally includes a text entry field configured for entry of search terms, and execution of the third-party applications include requesting search results from the (optionally remote) third-party applications using the search terms. Search results received from the third-party applications are optionally displayed together within the virtual keyboard. These search results may also be shared via a messaging application. Keystrokes typed into the messaging application are optionally used to automatically populate the text entry field. The virtual keyboard optionally represents an adapted interface to an independent application and the shortcut keys within the virtual keyboard are configured to individually access respective members of the third-party applications. The third-party applications may represent dependent applications accessed via adapted interfaces.

23 Claims, 17 Drawing Sheets

Related U.S. Application Data continuation-in-part of application No. 16/279,924, filed on Feb. 19, 2019, now abandoned, and a continuation of application No. 15/676,856, filed on Aug. 14, 2017, now Pat. No. 10,976,923, which is a continuation of application No. 15/675,706, filed on Aug. 12, 2017, now Pat. No. 9,904,469, and a continuation of application No. 15/675,686, filed on Aug. 11, 2017, now abandoned, and a continuation of application No. 15/675,698, filed on Aug. 11, 2017, now Pat. No. 9,939,962, application No. 16/944,120 is a continuation-in-part of application No. 15/550,767, filed as application No. PCT/US2017/017431 on Feb. 10, 2017, now Pat. No. 10,768,810, said application No. 15/676,856 is a continuation-in-part of application No. 15/550,767, filed as application No. PCT/US2017/017431 on Feb. 10, 2017, now Pat. No. 10,768,810.

(60) Provisional application No. 62/859,718, filed on Jun. 11, 2019, provisional application No. 62/836,710, filed on Apr. 21, 2019, provisional application No. 62/701,432, filed on Jul. 20, 2018, provisional application No. 62/632,380, filed on Feb. 19, 2018, provisional application No. 62/510,758, filed on May 25, 2017, provisional application No. 62/507,229, filed on May 17, 2017, provisional application No. 62/384,368, filed on Sep. 7, 2016, provisional application No. 62/358,266, filed on Jul. 5, 2016, provisional application No. 62/293,893, filed on Feb. 11, 2016.

(51) Int. Cl.

| | |
|---|---|
| *G06F 3/042* | (2006.01) |
| *G06F 3/0481* | (2022.01) |
| *G06F 3/04817* | (2022.01) |
| *G06F 3/0488* | (2022.01) |
| *G06F 3/04883* | (2022.01) |
| *G06F 9/54* | (2006.01) |
| *G06Q 30/0241* | (2023.01) |
| *G06Q 50/00* | (2024.01) |
| *H04L 51/52* | (2022.01) |
| *H04L 51/56* | (2022.01) |
| *H04L 67/06* | (2022.01) |
| *H04L 67/131* | (2022.01) |
| *H04L 67/14* | (2022.01) |
| *H04L 67/306* | (2022.01) |
| *H04L 67/53* | (2022.01) |

(52) U.S. Cl.
CPC ........ *G06F 3/0426* (2013.01); *G06F 3/04883* (2013.01); *G06F 9/543* (2013.01); *G06Q 30/0241* (2013.01); *G06Q 30/0277* (2013.01); *G06Q 50/01* (2013.01); *H04L 51/52* (2022.05); *H04L 51/56* (2022.05); *H04L 67/131* (2022.05); *H04L 67/14* (2013.01); *H04L 67/53* (2022.05); *G06F 3/0481*

(2013.01); *G06F 3/04817* (2013.01); *G06F 3/0488* (2013.01); *H04L 67/06* (2013.01); *H04L 67/306* (2013.01)

(58) Field of Classification Search
CPC ............ G06F 3/0488; G06F 16/90335; G06F 16/9038; G06F 2203/04803; G06F 3/0236; G06F 3/0412; G06F 3/0416; G06F 3/0426; G06F 3/04842; G06F 3/0485; G06F 3/04883; G06F 3/04895; G06F 40/205; G06F 40/274; G06F 40/279; G06F 9/543; G06F 16/951; G06N 5/022; G06N 5/041; G06Q 30/0241; G06Q 30/0277; G06Q 50/01; H04L 51/52; H04L 51/56; H04L 67/06; H04L 67/131; H04L 67/14; H04L 67/306; H04L 67/53; H04L 51/32; H04L 167/14; H04L 151/36; H04L 167/38; H04L 167/20; H04L 167/306; H04L 167/06; H04L 51/36; H04L 67/38; H04L 67/20; H04M 1/72469

See application file for complete search history.

(56) References Cited

U.S. PATENT DOCUMENTS

| | | | | |
|---|---|---|---|---|
| 9,330,180 | B2 * | 5/2016 | Kim ................. | H04M 1/72403 |
| 10,276,170 | B2 * | 4/2019 | Gruber .................... | G06F 3/167 |
| 2007/0233692 | A1 * | 10/2007 | Lisa ...................... | G06F 3/0488 |
| 2008/0242343 | A1 * | 10/2008 | Koh ................. | H04M 1/72403 |
| | | | | 707/E17.014 |
| 2010/0306228 | A1 * | 12/2010 | Carpenter ............. | G06F 16/951 |
| | | | | 707/765 |
| 2011/0191321 | A1 | 8/2011 | Gade et al. | |
| 2012/0256840 | A1 | 10/2012 | Razzaghi | |
| 2013/0033971 | A1 | 2/2013 | Stier | |
| 2014/0040231 | A1 * | 2/2014 | Lin ........................ | G06F 16/951 |
| | | | | 707/708 |
| 2014/0136990 | A1 | 5/2014 | Gonnen et al. | |
| 2014/0143223 | A1 * | 5/2014 | Shi ...................... | G06F 16/3322 |
| | | | | 707/706 |
| 2015/0084871 | A1 | 3/2015 | Yarvis et al. | |
| 2015/0121285 | A1 * | 4/2015 | Eleftheriou ......... | G06F 3/04842 |
| | | | | 715/773 |
| 2015/0156098 | A1 | 6/2015 | Richards et al. | |
| 2016/0006856 | A1 | 1/2016 | Bruno | |
| 2016/0034977 | A1 | 2/2016 | Bhaowal et al. | |
| 2017/0310616 | A1 | 10/2017 | Cao et al. | |
| 2017/0357443 | A1 * | 12/2017 | Paek .................... | G06F 3/0482 |
| 2018/0039406 | A1 * | 2/2018 | Kong .................... | G06F 16/951 |

OTHER PUBLICATIONS

Howe, A. E., & Dreilinger, D. (1997). Savvysearch: A Metasearch Engine That Learns Which Search Engines to Query. AI Magazine, 18(2), 19. https://doi.org/10.1609/aimag.v18i2.1290 (Year: 1997).*
CN201780018277.9, Office Action, Issued Jan. 21, 2021.
PCT/US20/29175, ISR and WO Dated Jul. 17, 2020.

* cited by examiner

610

210

410

ADVANCED KEYBOARD BASED SEARCH

CROSS-REFERENCE TO RELATED APPLICATIONS

This application is a continuation in part of PCT/U.S.20/29175, which claims priority to U.S. provisional applications 62/859,718 and 62/836,710;
this application is a continuation in part of U.S. non-provisional application Ser. No. 15/550,767;
this application is a continuation in part of U.S. non-provisional application Ser. No. 16/279,924,
non-provisional application Ser. No. 16/279,924 claims benefit of U.S. provisional application 62/507,229 and is a continuation-in-part of U.S. non-provisional application Ser. No. 15/676,856 filed Aug. 14, 2017;

non-provisional application Ser. No. 15/676,856 is a continuation-in-part of PCT/U.S.2017/017431 filed Feb. 10, 2017;

PCT/U.S.2017/017431 claims benefit of U.S. provisional patent application No. 62/293,893 filed Feb. 11, 2016, of U.S. provisional patent application Ser. No. 62/358,266 filed Jul. 5, 2016 and of U.S. provisional patent application Ser. No. 62/384,368 filed Sep. 7, 2016;

non-provisional application Ser. No. 15/676,856 also claims benefit of U.S. provisional patent application Ser. No. 62/507,299 filed May 17, 2017, of U.S. provisional patent application Ser. No. 62/510,758 filed May 25, 2017, and is a continuation-in-part of U.S. non-provisional patent application Ser. No. 15/550,767 filed Aug. 11, 2017, is a continuation of U.S. non-provisional patent application Ser. No. 15/675,686 filed Aug. 11, 2017, is a continuation of U.S. non provisional patent application Ser. No. 15/675,698 Filed Aug. 11, 2017 (now U.S. Pat. No. 9,939,962) and is a continuation of U.S. non-provisional patent application Ser. No. 15/675,706 filed Aug. 12, 2017 (now U.S. Pat. No. 9,904,469);

non-provisional application Ser. No. 16/279,924 further claims priority and benefit of U.S. provisional patent application Ser. No. 62/632,380 filed Feb. 19, 2018, and of U.S. provisional patent application Ser. No. 62/701,432 filed Jul. 20, 2018; and this application further claims priority to U.S. provisional patent applications: 62/836,710 filed Apr. 21, 2019 and 62/859,718 filed Jun. 11, 2019.

All of the disclosures of all of the above patent applications are hereby incorporated herein by reference in their entirety.

BACKGROUND

Field of the Invention

The invention is related to computer applications and more specifically to adapted interfaces for computer applications.

Related Art

Many applications, such as those found in mobile devices, include default user interfaces. These can include a virtual keyboard or other virtual input device. Typically, a user can select between different interfaces, such as a keyboard that includes Latin or Cyrillic characters. Such interfaces can include a dedicated function, such as a built-in search button configured to execute a search based on a text input.

SUMMARY

A user interface of a base application is replaced with a dynamic user interface that is configured to call functions of a separate dependent application. The base application can be any application that uses a virtual user interface, which can be replaced by alternative interfaces. For example, many mobile applications utilize a keyboard extension, supplied by an operating system, which is configured to display a virtual keyboard to a user. In some embodiments of the invention, the virtual keyboard interface is replaced by an adapted user interface configured for interaction with a different, dependent application. The replacement user interface is "nested" because the interface to a dependent application is placed and accessed within a different application. The replacement user interface is referred to herein as an "adapted" user interface because it usually, but not necessarily, requires some adaptation prior to being used within a base application. This adaption is often required because the dependent application was intended to be executed directly on an operating system—rather than from within a separate application—and has an interface configured for such execution. For example, prior to adaptation, the interface to an application may be configured to assume that all of a display is available for use.

The dependent application can be selected from a wide variety of alternative applications. The adapted user interface can be configured for sending a variety of different commands to the dependent application so as to take advantage of multiple capabilities of the dependent application. Examples, of dependent applications include browsers, games, social networking applications, image sharing applications, etc.

Various embodiments of the invention include a computing device comprising: a display; a base application configured to execute on the computing device and to present a first user interface on the display; a dependent application configured to execute on the computing device and to present a second user interface on the display; interface adaptation logic configured to adapt the second user interface for presentation within the first user interface; data transfer logic configured to transfer data from the second user interface to the first user interface; storage configured to store at least the dependent application; and a microprocessor configured to execute at least the interface adaptation logic.

Various embodiments of the invention include a method of executing an application, the method comprising: executing a base application on a first computing device, the base application including a user interface; retrieving an adapted user interface from a source external to the base application, the adapted user interface including at least one functional call to a dependent application; replacing the user interface within the base application with the adapted user interface; receiving an input from a user at the adapted user interface; passing the input to the dependent application; processing the input using the dependent application to produce an output of the dependent application; and providing the output to the user via the adapted user interface.

Various embodiments of the invention include a method of executing an application, the method comprising: selecting a first application from a plurality of third-party applications; adapting a user interface of the first application for execution of the first application from within a base application; selecting a second application from the plurality of third-party applications; adapting a user interface of the second application for execution of the second application from within the base application; adapting a default interface of the base application to include a shortcut icon to the first application and a shortcut icon to the second application; replacing the default interface of the base application with the adapted default interface including the shortcut ions to the first and second applications; receiving a selection of the shortcut icon to the first application at the adapted default interface; executing the first application; and replacing the adapted default interface with the adapted user interface of the first application within the base application.

Various embodiments of the invention include a computer executable code stored on a non-transient computer readable medium; the computer executable code comprising: keyboard logic configured to provide a virtual keyboard to a plurality of different communication applications on a first mobile device, the virtual keyboard including a first shortcut key configured to copy a first link into a text editing field of each of the communication applications, wherein the first link is configured to be received by a second mobile device and configured for delivery of the keyboard logic to the second mobile device.

Various embodiments of the invention include a computer executable code stored on a non-transient computer readable medium; the computer executable code comprising: application logic configured to execute a third-party application on a first mobile device; and keyboard logic configured to provide a virtual keyboard to a plurality of different communication applications on the first mobile device, the virtual keyboard including a first shortcut key configured for placing a first link into a text editing field of each of the communication applications, wherein the first link is configured to be received by a second mobile device and configured for provisioning of the application logic to the second mobile device.

The executable code discussed herein is optionally provisioned on a server comprising: a memory configured to store a plurality of applications, at least one of the application including the computer executable code; access logic configured for users to browse and select members of the plurality of applications; an I/O configured to communicate with a plurality of remote clients over a communication network and to provide the selected members of the plurality of applications to the remote clients; and a processor configured to execute at least the access logic.

Various embodiments of the invention include an application server comprising: a memory configured to store a plurality of applications; access logic configured for users to browse and select members of the plurality of applications; an I/O configured to communicate with a plurality of remote clients over a communication network and to provide the selected members of the plurality of applications to the remote clients; a processor configured to execute at least the access logic, wherein at least a first of the applications includes keyboard logic configured to provide a virtual keyboard to a user of a first mobile device, the virtual keyboard including a first shortcut key configured to provide a first link to a text editing field of a communication application, wherein the first link is configured to be received by a second mobile device and configured for provisioning of the first of the applications on the second mobile device.

Various embodiments of the invention include a method of using a keyboard extension, the method comprising: receiving the keyboard extension, the keyboard extension being configured to replace a default virtual keyboard in a messaging application and including a first shortcut key for accessing a first application from within an interface to the messaging application, the "accessing" optionally includes executing or downloading the first application; placing the keyboard extension and the first application in a digital package configured for downloading to remote clients; providing the package to a first remote client; receiving tracking data characterizing usage of the shortcut key on the first remote client; and engaging in a financial transaction in responsive to the usage.

Various embodiments include a virtual keyboard includes a text input field configured for searching multiple third-party applications in response to a single search request. Keys included within the keyboard allow a user to direct a search to a specific application or to multiple applications at once. The virtual keyboard and associated search field are optionally used within messaging applications and search results can be shared within these applications.

The text input field is optionally automatically populated in response to keystrokes entered by a user while focus of the keyboard is on a second text input field of a messaging application. Search results may be presented grouped by third-party application. The order of search results, and/or order of third-party application result grouping, is optionally dependent on the terms searched.

Various embodiments of the invention include a mobile device comprising: a display; keyboard logic configured to present a virtual keyboard within the display; a messaging application including a first text input field configured to receive keystrokes from the virtual keyboard; user interface logic configured to present a second text input field within the keyboard, while the first text input field is displayed; search logic configured to receive one or more search terms from the second text input field, to send the search term(s) to at least two different applications in response to a single search request, and to receive search results from the at least two third-party applications; and display logic configured to display the search results within the keyboard on the mobile device. The search results are optionally ranked and/or sorted, e.g., dependent on an advertising business model or relevance to the search term. They may be thus sorted by source of the search results.

Various embodiments of the invention include a method of providing content to a display, the method comprising: optionally receiving a selection of at least a first application and a second application; opening a keyboard within a messaging application, the messaging application including a first text input field configured to receive keystrokes from the keyboard, the keyboard including a second text input field, a shortcut key to the first application, a shortcut key to the second application and a global search key; optionally detecting entry of a keyword into the first text input field via the keyboard; receiving a search term at the second text input field; the search term optionally being related to the detected keyword, optionally automatically placing a search term into the second input field, the search term being related to the detected keyword; receiving a selection of the global search key; sending the search term to the first application, in response to the selection of the global search key; sending the search term to the second application, in response to the selection of the global search key; receiving a first search result from the first application; receiving a second search result from the second application; displaying both the first and second search result together within the keyboard; optionally receiving selection of the shortcut key to the first application while both the first and second search result are displayed within the keyboard; optionally expanding the search results of the first application as shown in the display, in response to selection of the shortcut key to the first application, optionally removing the second search results from the display to make room for more of the search results of the first application; optionally receiving a selection of an item within the first search results; optionally placing the selected item within the first text input field, in response to the selection of the item; and optionally sending the selected item from the first text input field as part of a message to a remote party via the messaging application.

Various embodiments of the invention include a method of providing search results, the method comprising: displaying a keyboard within a base application, the keyboard including at least one search key, the base application including a first text entry field configured to receive keystrokes from the keyboard; receiving a search term via the keyboard; receiving a user selection of the search key; requesting search results from a plurality of dependent applications in response to the selection of the search key; receiving search results from at least a first remote dependent application and a second remote dependent applications, the search results being based on the received search term; and replacing at least part of the keyboard with the received search results.

DETAILED DESCRIPTION

Figure 1:
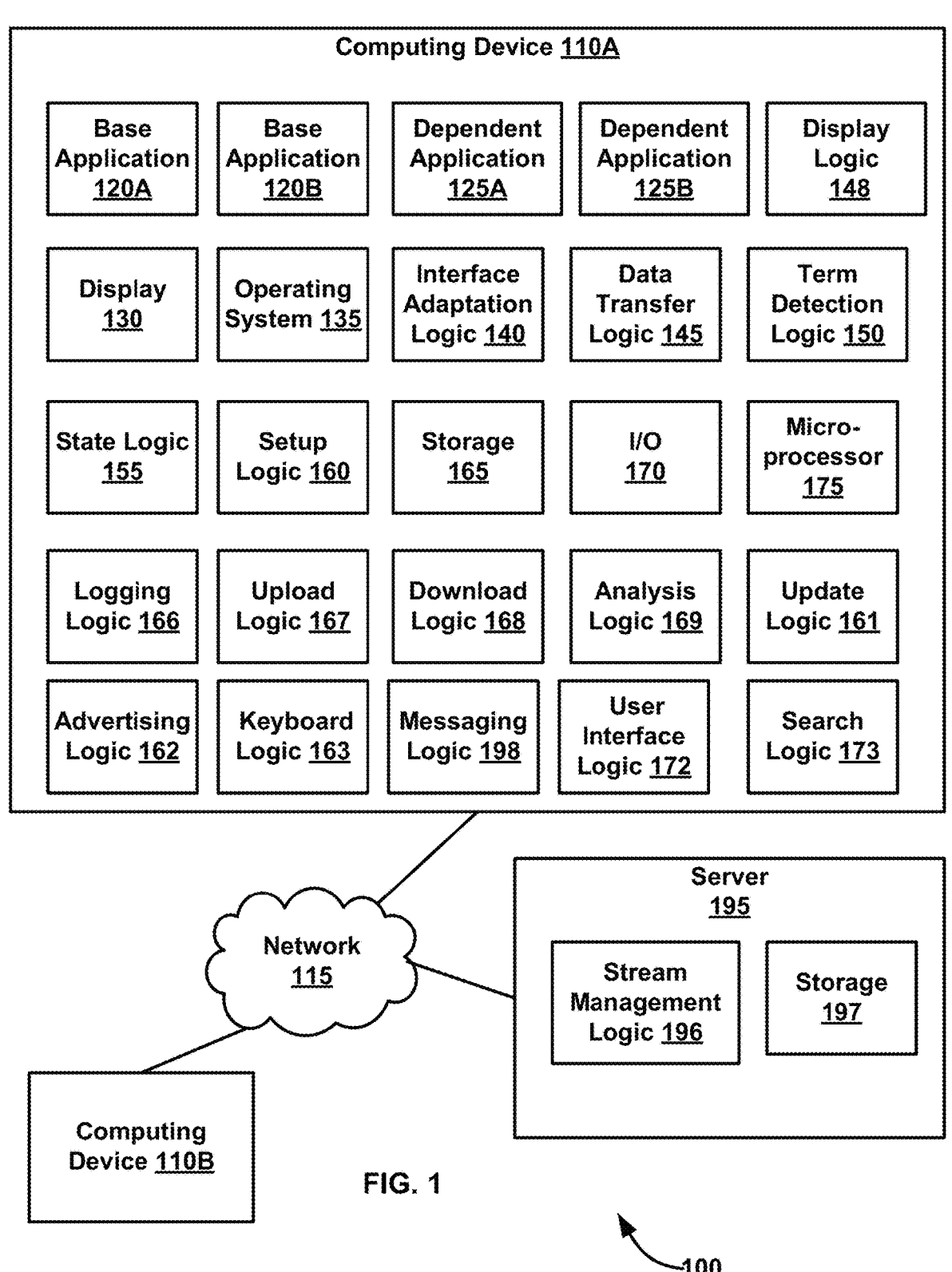
FIG. 1 illustrates a computing system, according to various embodiments of the invention.

FIG. 1 illustrates a Computing System 100, according to various embodiments of the invention. The illustrated Computing System 100 includes a plurality of Computing Devices 110 (individually identified 110A, 110B, etc.), a Network 115, and an optional Server 195.

Computing Devices 110 include a computing device or system configured to execute computing instructions. Computing Devices 110 can be a mobile device, a tablet computer, a laptop computer, a desktop computer, a personal computer, a laptop computer, a tablet computer, a mobile communication device (e.g., smartphone), a wearable device, a headset, and/or the like. Network 115 is a communication network, such as the Internet or a cellular network, over which data packets are communicated using destination addresses such as a phone identifier, MAC or IP addresses. Network 115 optionally communicates using a standard such as TCP/IP. Systems discussed herein may include a device within a single housing or alternatively a plurality of connected parts in different enclosures that make up the system. For example, the components of Computing Device 110A may all be including in a cellular telephone or tablet computer having a single housing (e.g., case).

Computing Devices 110 include a Display 130 configured to present a graphical interface to a user. In various embodiments, Display 130 is a display screen of a personal computer, a laptop computer, a tablet computer, a mobile communication device (e.g., smartphone), a wearable device, a headset, and/or the like. Display 130 is optionally a touch sensitive display.

Computing Devices 110 include one or more Base Applications 120 (individually designated 120A, 120B, etc.). Base Applications 120 are applications installed on Computing Devices 110 and include hardware, firmware and/or software stored on a non-transient computer readable medium. Base Applications 120 can include, for example, text messaging applications, e-mail applications, drawing applications, e-commerce applications, social network applications, map applications, search applications, browser applications, and/or the like. Typically, Base Applications

120 make use of a virtual keyboard or similar virtual interface that is configured for a user to provide keystrokes or to select objects. The virtual interface may be provided by an operating system of Computing Devices 110. For example, a virtual keyboard may be provided as an application extension by the iOS operating system offered by Apple, Inc. The virtual interface may be shared by multiple applications installed on each of Computing Devices 110. In some embodiments, the virtual interface is selectable from within Base Applications 120. For example, a user may select between keyboards having Roman or Cyrillic fonts. The virtual interfaces of Base Applications 120 may include non-keyboard interfaces. Typically, a predetermined amount of screen real estate (pixel area) is assigned to the virtual interface. In some embodiments, Base Applications 120 include iOS messenger, Facebook messenger, WhatsApp, SnapChat, WeChat, and/or the like. These messenger applications are associated with separate social networks. For example, Facebook messenger is used with the Facebook social network, and iOS messenger is associated a network of a user's contents.

Computing Devices 110 include one or more Dependent Applications 125 (individually designated 125A, 125B, etc.). Dependent Applications 125 are applications installed on Computing Devices 110 and include hardware, firmware and/or software stored on a non-transient computer readable medium. As with Base Applications 120, Dependent Applications 125 can include, for example, GIF applications, sticker applications, podcast applications, transportation applications, music applications, review applications, text messaging applications, drawing applications, e-commerce applications, e-mail applications, social network applications, map applications, search applications, browser applications, an HTML shell, and/or the like. Some embodiments include at least two, three, four, five or more of these Dependent Applications 125. An HTML shell is an application configured to execute HTML instructions, as may be accomplished by a browser. An HTML shell is optionally configured to accept and use extensions such as Java or Adobe Flash.

A particular application can be a Base Application 120 at some times and a Dependent Application 125 at other times. The distinction between Base Applications 120 and Dependent Applications 125 is that the functionality of Dependent Applications 125 may be called within a nested user interface of Base Applications 120. An application is a Dependent Application 125 when it is accessed through an interface within one of Base Applications 120. The Dependent Application 125 discussed herein are typically accessed via an adapted user interface that is not a default interface of the Base Application 120 but has specifically been adapted for accessing the Dependent Application 125 from within a Base Application 120. The adapted user interface is typically not a default interface of either Dependent Application 125 or Base Application 120, but is an adaptation of a default interface to the Dependent Application 125. Further examples of Base Applications 120 and/or Dependent Applications 125 include a Facebook® application, a Youtube® application, a search application, a map application, an e-mail application, Instagram®, a music application, a picture sharing application, a video sharing application, a social media application, and/or the like. As the terms are used herein, an operating system is not considered an example of Base Application 120. The adaptation of a default interface can include, for example, resizing, reorganization, addition or removal of elements, changes in memory requirements, addition or removal of functionality, and/or the like. For example, a default interface to a dependent application may be adapted to fit within and/or occupy space previously occupied by a QUERTY keyboard or multiple keys thereof, or previously occupied by one or more shortcut keys discussed further elsewhere herein.

The output of Dependent Applications 125 can include a user interface, graphics, images, links, URLs, videos, audio, text, commands, data, metadata, HTML, scripts, computing instructions, and/or the like. For example, Dependent Application 125A may be configured to provide a user interface configured for a user to edit a photo. Dependent Application 125A may be configured to provide a user interface configured for the user to play a game, the game optionally being a multiplayer game played by users at different Computing Devices 110. Dependent Application 125A may be configured to provide a user interface to an e-commerce website or application in which a user can select and purchase products or services. Dependent Application 125A may be configured to provide a user interface to a browser.

Both Base Applications 120 and Dependent Applications 125 are optionally third-party applications installed on Computing Device 110A from a library of applications. For example, these applications may be installed from the Apple App Store or from Google Play. As a third-party application, they are normally configured to receive updates from the third-party source. As discussed further herein, in some embodiments, a user can select which applications should be accessible from within a user interface active within Base Applications 120. More than one Dependent Application 125 is optionally accessible from within a single user interface. For example, a user interface can include a keyboard and a plurality of shortcut-keys ("shortcuts" or "hotkeys"), each of which is represented by an icon and is configured to evoke a different member of Dependent Applications 125. Execution of a shortcut-key optionally results in the current user interface being replaced with a different (nested) user interface configured for accessing the associated member of Dependent Applications 125.

In various embodiments, each of the shortcut keys is configured to present an adapted interface of one of Dependent Applications 125 within Display 130, within Virtual Keyboard 215 (discussed elsewhere herein), and/or within a Messaging Application 210 (discussed elsewhere herein). For example, an adapted interface of Dependent Application 125 may be displayed within all or part of space taken by Virtual Keyboard 215 and optionally part of the space previously taken by Messaging Application 210.

Execution of a shortcut key optionally results in a search request being sent to the associated member of Dependent Applications 125. For example, if one or more search terms are provided prior to execution of a shortcut key, then a search on that term may be sent to the associated member of Dependent Applications 125.

Computing Devices 110 further include one or more Operating System 135. Examples of Operating System 125 include iOS, Android and Windows. Base Application 120A and Dependent Application 125A are typically configured to both execute on Operating System 125. Computing Devices 110A and 110B optionally include different Operating Systems 135. In some embodiments, the interface to Base Application 120A, which is replaced by an adapted interface to Dependent Application 125A, is provided by Operating System 125. For example, the iOS operating system provides a variety of alternative virtual keyboards that can be called by applications executing on this operating system.

Computing Devices 110 further include Interface Adaptation Logic 140. Interface Adaptation Logic 140 is configured to adapt an interface of one or more Dependent Applications 125 for display within one or more Base Applications 120. The adapted interface is typically displayed within the Base Applications 120 as a substitute for a default user interface. For example, a keyboard interface that is otherwise displayed within Base Application 120A may be replaced with an adaption of a user interface of Dependent Application 125A.

The adaptation performed by Interface Adaptation Logic 140 can include a variety of changes and functionality. For example, Interface Adaptation Logic 140 may adapt the size of a user interface of Dependent Application 125A so as to fit within a particular screen area of Display 130. Interface Adaptation Logic 140 may also provide an API (Application Program Interface) configured to communicate commands and updates between Dependent Application 125A and the adapted interface. Adaptation of a user interface is optionally responsive to a keyword. For example, entering "car" in a field of an adapted user interface or a default application may result in an adapted user interface that includes an advertisement related to cars, or includes other car related content.

Adaptation of an interface size can include changing the number of pixels within Display 130 taken by the adapted user interface. For example, if the adapted user interface is replacing all or part of an existing user interface, the adapted user interface may initially be adapted to occupy a subset of pixels that were occupied by the replaced user interface. The height/width ratio of the adapted user interface may additionally be adapted to fit the available screen space.

Adaptation of a user interface can include addition of advertisements to the user interface. These advertisements optionally include links configured for purchasing products or services. Such advertisements are optionally communicated between Computing Devices 110 and/or communicated to a Base Application 120, as part of the various communications described elsewhere herein.

Interface Adaption Logic 140 is optionally configured to adapt the size and orientation of an adapted user interface of Dependent Application 125A in response to a variety of criteria. These criteria include, for example: a) the size of an interface that the adapted interface is replacing in Base Application 120, b) an orientation and/or movement of Computing Device 110A (e.g., rotation from portrait to landscape mode), c) the identity of Base Application 120A, d) a user command entered on the adapted user interface, e) a command received via Network 115 (e.g., from Computing Device 110B and/or a Server 195), f) a state of Dependent Application 125A, and/or the like. In a specific example, the size of an adapted user interface can be change in response to a game state. Parts of a game requiring a more detailed interface (e.g., more buttons) may be shown in a larger area of Display 130 relative to parts of a game requiring a less detailed interface.

In specific examples, an adapted interface may be sized to occupy the display area previously occupied by a virtual keyboard part of an interface. When Computing Device 110A is rotated from a portrait orientation to a landscape orientation the fraction of Display 130 occupied by the adapted display can be increased. For example, an adapted user interface that occupied less than 50% of Display 130 in the portrait orientation may occupy between 90 and 100% of display in the landscape orientation.

A user interface to Dependent Application 125A that is adapted by Interface Adaptation Logic 140 may be responsive to an identity of Base Application 120. For example, a user interface inserted into a text messaging application may be presented as a larger size than when the same dynamic user interface is inserted into a picture sharing application.

In some embodiments, a user interface to Dependent Application 125A is presented at the same size as a specific part of the default interface to Base Application 120A that it replaces. The size and content of the user interface may then be changed in response to the various factors discussed herein. Changes to the user interface may be in response to a state of Base Application 120A and/or Dependent Application 125A. A user interface to Dependent Application 125A is optionally changed in response to commands received by Computing Device 110A via Network 115. These commands may be received from Computing Device 110B, from Server 195, and/or from some other source. In an illustrative example, Dependent Application 125A is a multi-player game application that allows a first player at Computing Device 110A to play against a second player at Computing Device 110B. The state of the game can be maintained on Computing Devices 110A and 110B, and/or at Server 195. Commands and game state data can be communicated to Computing Device 110A and there used to change the content and/or size of the user interface displayed within Base Application 120A. Likewise, inputs provided at the user interface can be communicated via Network 115 to other Computing Devices 110 and/or Server 195. The Base Applications 120 used to host the adapted user interface to Dependent Application 125A on different Computing Devices 110 can be different. For example, to players can be playing a game together, one of the players using an interface hosted by an e-mail application and the other of the players using an interface hosted by a text messaging application. Likewise, if a user starts a game on Computing Device 110A with a user the interface hosted by Base Application 125A, the user may close Base Application 125A and continue the game using a user interface hosted by Base Application 125B. The adapted interface can optionally be accessed through any of Base Applications 125. The communication of commands and data between Dependent Application 120A and an adapted user interface displayed within Base Application 125A typically occurs through an Application Program Interface (API).

Computing Devices 110 optionally further include Data Transfer Logic 145. Data Transfer Logic 145 is configured to transfer data and commands between Base Applications 125 and Dependent Applications 120. For example, if Base Application 125A includes a virtual keyboard and configured to receive keystrokes from this virtual keyboard, then Base Application 125A can receive "keystrokes" from an adapted user interface (to Dependent Application 120A) that replaces the virtual keyboard. Data Transfer Logic 145 can be configured to accept user input at the adapted user interface and to provide input to Base Application 125A in response to this user input.

Data Transfer Logic 145 may modify the user input prior to providing it to Base Application 125A. For example, Data Transfer Logic 145 may translate between languages, may encrypt data, may replace a character with a graphic, replace a character with an image, and/or the like. Data Transfer Logic 145 is optionally configured to call functions within Dependent Application 120A in response to a user input and then to provide an output of these functions to the adapted user interface and/or Base Application 125A. For example, a user may enter a character on the adapted user interface, this character is communicated by Data Transfer Logic 145 to Dependent Application 120A wherein it is used to select an image. Data Transfer Logic 145 then provides keystrokes (e.g., characters or screen touch points) to Base Application 125A to prepare Base Application 125A to receive the image. These keystrokes may mimic actions that would normally prepare Base Application 125A to receive an image (e.g., selection of a camera icon and a "use existing photo" option). The image can then be provided to Base Application 125A. If Base Application 125A is a text messaging or e-mail application the image can automatically appear in the appropriate input field. Thus, Data Transfer Logic 145 can be configured to automatically transfer data between Base Applications 125 and Dependent Applications 120.

Data Transfer Logic 145 is optionally configured to correlate the positions on a touch sensitive embodiment of Display 130 with specific functions, as a user interface is adapted to various sizes. For example, Data Transfer Logic 145 can be configured to correlate a touch position with an icon displayed on the interface and, based on this correlation, call functions of Dependent Application 125A that are associated with the icon.

In some embodiments, Data Transfer Logic 145 is configured to transfer contents to a cut/paste buffer of Operating System 135. These contents can then be copied to input fields of Base Applications 120 using a "paste" operation under user control. For example, in response to selection of a shortcut-key, keystrokes, a link, an image, or any other content can be copied to a cut/paste buffer. The content may come from one of Dependent Applications 125 and/or from a Storage 165 (discussed further below). Alternatively, Data Transfer Logic 145 may be configured to directly copy such contents into the input fields of Base Applications 120 (without requiring a user to perform a paste action). For example, a shortcut-key on a virtual keyboard displayed in Base Application 120A may be configured to (when selected) automatically copy a link (or any other content) from Storage 165 to an input field of Base Application 120A. Further, Data Transfer Logic 145 may be configured to retrieve data from a source external to Computing Device 110A and transfer all, part and/or a derivative to the retrieved data to the input field of Base Application 120A.

In some embodiments, Data Transfer Logic 145 is configured to transfer received search results to an input text field of Base Application 120A. For example, search results received from one or more of Dependent Applications 125 may be transferred to the text input field of a messenger application as a link, an image, a GIF, and/or the like. The received search results are optionally first displayed within a part of Display 130 previously occupied by a keyboard and/or shortcut keys, and selected by a user for transfer to the text input field of the messenger application. The received search results are optionally received from multiple Dependent Applications 125 and displayed together at the same time.

In some embodiments, Data Transfer Logic 145 is configured to modify a link and/or graphic included in the transferred results. For example, an identifier and/or download link to the particular Dependent Application 125A from which the search results were obtained can be added to the transferred search result. In another example, an identification tag (e.g., a marketing campaign tracking tag, user identification tag, and/or source tag) may be added to the search results. In another example, a URL within the search results may be shortened or expanded prior to placement in the text input field of Base Application 120A. A link included the transferred results may be configured to engage in an economic transaction and/or to download one or more Dependent Applications 125. The link included in the transferred results may be configured to download Data Transfer Logic 145 and/or any of the other logic discussed herein. In another example, a watermark may be added to an image.

In some embodiments, Data Transfer Logic 145 is configured to transfer information regarding an advertisement displayed within part of Display 130, and optionally selected by a user. For example, the transferred information can include graphics, product information, links to e-commerce websites, tracking identifiers, product pages, application download links, video links, and/or the like, associated with the advertisement.

Computing Device 110A optionally further includes Logging Logic 166. Logging Logic 166 is configured to generate a log of the transfers of data from the user interfaces of Dependent Applications 120 to an input field of Base Application 120A or 120B. For example, Logging Logic 116 may be configured to generate a record in a log that an output of Dependent Application 120A was inserted into an input field of Base Application 120A, the input field being part of a user interface to Base Application 120A. The logging performed by Logging Logic 166 can be automatic and the resulting record can include data representative of the output of Dependent Application 120A or 120B. As used herein, the term "log" is meant to mean a set of records of events, the set optionally including an ordered sequence of events. As a verb, "log" or "logging" refers to the addition of a record of an event to a log. A log can be stored in a file or a data structure.

Logs are optionally shared and/or subscribed to. For example, a user of Computing Device 110B may subscribe to a log generated at Computing Device 110A and a log generated at Computing Device 110B may be shared to multiple destinations including Server 195 and/or other Computing Devices 110. A subscriber to a log may execute an instance of Dependent Application 120A configured for accessing logs and use that Dependent Application 120A to share data within the logs to others using an input field of Base Applications 120A or 120B. In a specific example, a user of Computing Device 110B may copy a gif from Dependent Application 120A to Base Application 120A, and subsequently copy a link to a song on Spotify from Dependent Application 120B to Base Application 120B. Both of these events are added to a log generated on Computing Device 110B. The generated log may then be communicated to Computing Device 110A, optionally via Server 195. At Computing Device 110A the log is received as part of an input stream that may include logs generated at multiple sources. A user of Computing Device 110A may access the input stream using another member of Dependent Applications 125 and select objects within the input stream to place in an input field of any of Base Application 120. For example, the user may share the gif using Facebook messenger and the link to the Spotify song using WhatsApp. Each of these sharing events are optionally recorded as part of a log on Computing Device 110A. As such, data and object represented by this data can be shared among multiple Computing Devices 110 in a linear and/or serial fashion. The logs discussed herein are distinguished from a mere list of frequently used links or gifs by, for example, the fact that they may include use between multiple Dependent Applications 125 and multiple Base Applications 120, further the logs my include a combination of links, images, gifs, text, audio, and or the like.

The log generated by Logging Logic 116 can include a copy of the actual data inserted into the input field, a link to that data, and/or some other representation the outputs of one or more of Dependent Applications 120. The log optionally further includes metadata characterizing the outputs.

For example, a record within a log can include metadata characterizing an original owner or source of the output. This may include a website from which the output was first obtained, an editor or creator of the object included in the output. Specifically, the record can include an identity of the creator of an animated gif or of a recording.

A record within a log can include a unique identifier of the output. As is described elsewhere herein, this identifier can be used to map sharing of an object between Computing Devices 110. Unlike systems of the prior art, this tracking is independent of a social network associated with a specific messaging application. Sharing of an object can be tracked/mapped as it is communicated using and between e-mail, Facebook Messenger Instagram and WhatsApp. This tracking maps out a user's entire set of social networks, creating an inter-network map associated with the "super-network" of a specific user. Each of the users and/or their Computing Devices 110 may be identified by a unique identifier of this super-network that include multiple, previously separate, social networks. In alternative embodiments, instead of a unique identifier for an object, mapping of sharing of an object may be based on a sharing history and/or the actual object data. For example, a first image shared to Computing Device 110A may be compared to a second image later shared from Computing Device 110A to Computing Device 110B. If this comparison shows the first and second images are the same, it can be concluded that the same object was shared. This conclusion may be made independent of the members of Base Application 120 and/or Dependent Application 125A used to share the image Shared data is optionally assigned a unique identifier when first shared or added to a log of shared data. In some embodiments the unique identifier of the data is based on a unique identifier of user and a timestamp.

A record within a log can include a link to a cache of the output. For example, the data within a log can include a link to a location on Server 195 on which an image, an application, and/or any other web content is stored. A link to an application can be configured to download the application or to execute the application remotely. Coupled with a unique identifier, this information is optionally used to map sharing of an application between users.

A record within a log can include a tags characterizing data shared using the systems and methods described herein. For example, an image may be associated with metadata characterizing contents of the image, an application may be associated with data on which the application executes, an image, animated gif, song or a video may be associated with metadata classifying the image, gif, song or video. The classification and other tags are optionally used to search for the data within one or more logs. In some embodiments, users can add tags to data prior to sharing the data.

A record within a log can include a number of times that data has been shared. This count may include the number of times data has been place in an input fields of Base Applications 120 or the number of times data has actually been communicated from members of Computing Devices 110 to other members of Computing Devices 110 or other devices capable of executing Base Applications 120A. For example, a record can include a record of how many times an image or a link to a video has been placed in an input field of a Base Application 120A from Dependent Application 125A. Such accounting can be specific to a particular member of Base Applications 120, specific to a particular member of Dependent Applications 125, specific to a particular class of Base Applications 120 and/or Dependent Applications 125, and/or general to all sharing events. In some embodiments the accounting of sharing events is performed at Server 195 and each sharing event results in sending an increment counter command to Server 195. The increment counter command may include the unique identifier of the data as well as an identity of the user/Computing Device 110, identity of a member of Base Applications 120, and/or identity of a member of Dependent Applications 125, involved in the sharing event.

A record within a log can include a count of "likes", comments made on an object (or link there to), identities of users who made comments and/or likes, etc. In some embodiments, the meta data includes a history of users/Computing Devices 110A that shared the data.

In some embodiments, a user of Computing Device 110A can modify or select metadata included in a log of shared data. For example, a user may add tags characterizing content or classification of shared data. A user may restart a counter of how often data has been shared or hide the original source/owner of shared data.

When the metadata associated with a sharing event includes a link to an owner or source of the shared data, the link is optionally used to follow other data generated from that source. For example, if the shared data includes an image that originated from an Instagram account, the data may include a "follow" link configured to allow a user to follow further images posted on that account using the functionality of Instagram's image sharing network. In some embodiments, members of Base Applications 120 are optionally set to open links automatically.

The log created using Logging Logic 166 may be stored in Storage 165 and/or may be uploaded to a Storage 197 of Server 195. The log and any of the metadata therein is optionally used by Advertising Logic 162 to select advertisements for display to a user. For example, tags characterizing contents of a video may be used to select related advertisements. These tags are optionally added to the metadata by users that shared the data. Data related to a count of time data is shared is optionally used to generate input streams of data that is popular to share. The popularity of sharing may be dependent on the members of Base Applications 120 and/or Dependent Applications 125 involved in any specific sharing event. For example, some data may be more popular to share within a WhatsApp account and different data may be relatively more popular to share within Facebook messenger.

Logs of shared data are typically associated with a particular user and/or member of Computing Devices 110. These logs are part of a user profile that can include a user identifier, a history of sharing data, a history of being an original source of shared data, a history of editing/modifying shared data, a history of application usage, user characteristics provided by the user (e.g., gender and age), user characteristics generated by Analysis Logic 169 (discussed elsewhere herein), a list of "followers" who follow the sharing logs generated by the user, a stream following list of external logs followed by the user, and/or the like.

Computing Devices 110 optionally further include State Logic 155 configured to maintain a current state of one or more Dependent Applications 125 and/or Base Applications 120. This state can be used to pause execution of an application, to facilitate transfer of an interface between Base Applications 120, to synchronize application states between different Computing Devices 110, and/or the like. It can be desirable to pause execution of Dependent Applications 125 and/or Base Applications 120 while the other is in use. For example, if the adapted interface to Dependent Application 125A is currently occupying most of Display 130, then it can be desirable to pause Base Application 120A until the adapted interface is resized so that more of Base Application 120A is visible. Pausing and resuming of Base Application 120A can be responsive to the fraction of Display 130 that is occupied by the adapted interface to Dependent Application 125A.

An interface to Dependent Application 125A can be transferred from Base Application 120A to Base Application 120B simply be closing Base Application 120A (where the adapted interface is currently hosted), executing Base Application 120B and hosting the interface to Dependent Application 125A within Base Application 120B. State Logic 155 is optionally configured to pause the execution of Dependent Application 125A between the time Base Application 120A is closed and the adapted interface is hosted in Base Application 120B. State Logic 155 stores the state of Dependent Application 125A during this time.

State Logic 155 is used to synchronize application states between different Computing Devices 110 in a variety of embodiments. For example, if Dependent Application 125A is a multiplayer game or a collaborative editing application, a current state of the application may be needed at several Computing Devices 110 and/or Server 195. State Logic 155 is optionally configured to communicate the current state between these systems via Network 115. In one example, Dependent Application 125A is a computer game configured to be played by two or more players at different Computing Devices 110. The state of the computer game is responsive to moves or actions taken by each player at their respective member of Computing Devices 110, and is communicated between devices by State Logic 155.

In some embodiments, Base Application 120A is used to communicate between instances of Dependent Application 125A on different Computing Devices 110. This is possible where Base Application 120A is a communication application such as a text messaging application. As discussed elsewhere herein, the adapted interface to Dependent Application 125A may be configured to provide data to Bases Application 120A as would be provided by a virtual keyboard or other interface. This feature can be used to insert data in a messaging application that is then conveyed via the messaging application to a different member of Computing Devices 110. At the different member of Computing Devices 110, the inserted data is parsed and used to update a state of a corresponding Dependent Application 125A. In a specific example, a computer game can be played between two mobile devices (e.g., smart phones or tablet computers) and a text messaging application can be used to share game states between these devices. The data provided to the text messaging application can include plain text, encoded text, graphics, images, identifying information, input to other applications, links, and/or the like. For example, the data provided may include contact information or a link to contact information. Data can be encoded within the graphics or images. The use of a text messaging system, or other messaging system, to communicate between Dependent Applications 125 on different Computing Devices 110 can be applied to applications other than game applications. Examples of such other applications include cooperative editing applications, e-commerce applications, Internet of things (IoT) devices (e.g., sensors, cameras, internet appliances, etc.), and/or the like.

Computing Devices 110 optionally further include Setup Logic 160. Setup Logic 160 is configured to select applications that may become Dependent Application 120A or 120B within a particular member of Computing Devices 110. The applications are typically selected from a plurality of third-party applications and multiple applications may be selected. In some embodiments the third-party applications are received and updated from an application repository, such as the Apple App Store.

Setup Logic 160 is optionally configured to assure compatibility of an application for use as one of Dependent Applications 120. Compatibility may require that an interface to the application can properly be adapted for presentation within Base Applications 120. For example, Setup Logic 160 may determine if an interface to the application can be adapted to replace a virtual keyboard with Base Applications 120. In some embodiments, Setup Logic 160 is configured to try one or more adaptation templates in an attempt to find an adaptation template that results in a compatible adapted user interface. An adaptation template includes rules for the reduction of an interface size, reduction and rearrangement of icons, mapping of touch sensitive positions, addition of navigation tools to navigate a partially viewable interface, and/or the like.

In some embodiments, Setup Logic 160 is configured to add a shortcut icon to a virtual interface, the shortcut icon being a short cut to a selected application, the shortcut icon representing a shortcut key. For example, Setup Logic 160 may be configured to add a plurality of shortcut keys (e.g., a menu of shortcuts) to a virtual keyboard interface. This virtual keyboard interface (including the shortcut icons/keys) can then be used as an adapted interface to replace a default keyboard interface that may be provided by Operating System 135. Each shortcut key is configured to execute and/or send search queries to a different Dependent Application 120A, and/or cause Data Transfer Logic 145 to transfer data to the Base Application 120A. Optionally, when a shortcut icon is selected the current adapted user interface is replaced by an adapted user interface to the member of Dependent Applications 125 associated with the shortcut icon. Optionally, when a shortcut key is selected, search terms are sent to an associated member of Dependent Applications 120. Thus, an adapted user interface is used to provide access to a plurality of applications, each of which would replace the adapted user interface with a second adapted user interface for that respective application.

Setup Logic 160 is optionally configured to select which members of a list possible Dependent Applications 120 to include as shortcut keys in a keyboard, and/or to select which members of a list of possible Dependent Applications 120 to send search terms to as part of a global search and, thus to select which search results to display on Display 130 (optionally within space occupied by the keyboard).

Computing Devices 110 optionally further include Storage 165 configured to store data, metadata and computing instructions. For example, Storage 165 may be configured to store adapted interfaces, images, text, interface templates, links, metadata, and/or executable code. In some embodiments Storage, 165 is configured to store the instructions of Bass Applications 125 and/or Dependent Applications 120. In some embodiments, Storage 165 is configured to store scrips, links, and/or computing instructions configured to retrieve content from a source external to Computing Device 110A, e.g., Server 195. Storage 165 can include a hard drive, random access memory (dynamic or static), non-volatile memory, magnetic media, flash memory, optical memory, and/or other digital storage.

Storage 165 is optionally configured to store a set of keywords on members Computing Devices 110. As is described elsewhere herein, these keywords are optionally configured to facilitate automated selection of search terms. One or more members of the keywords are optionally associated with a member of Dependent Applications 120. This association is optionally dependent on a financial transaction and/or on an advertising bidding system, e.g., Google AdWords™.

Computing Devices 110 further include an I/O 170. I/O 170 includes communication logic configured to communicate with external devices, for example, via Network 115. I/O 170 can include a wireless transmitter, an Ethernet connection, a modem, a router, and/or the like. I/O 170 can further include logic configured to place data in data packets, add internet protocol addresses to data packets and/or to encrypt data packets using standard internet protocols. I/O 170 typically includes data buffers configured to facilitate the sending and receiving of data over Network 115.

Computing Devices 110 further include a Microprocessor 175. Microprocessor 175 includes a microprocessor, an ASIC, a programmable logic array, a communication circuit, a central processing unit, and/or the like. Processor 110 is typically configured to perform specific tasks by the addition of software and/or firmware. For example, Processor 110 may be configured to execute Base Applications 125, Dependent Applications 120, and/or any of the other logic discussed herein.

Server 195 may be a file server, a web server, an application server, and/or the like. Server 195 can include one or more computing devices in communication with Computing Devices 110 via Network 115. In various embodiments, Server 195 can include State Logic 155, Setup Logic 160, Storage 165, I/O 170, and/or Microprocessor 175. Server 195 optionally includes computing instructions that are part of Base Application 120A or Dependent Application 125. For example, Dependent Application 125A may include text-to-voice or voice-to-text functionality wherein the actual conversion between voice and text is performed at Server 195.

In some embodiments one or more of Dependent Applications 125 include an application whose primary purpose is to provide the functionality of a virtual keyboard. For example, a purpose of the Hyperkey Chat 2.0™ application available at the Apple App Store is to provide a virtual keyboard using a combination of Interface Adaption Logic 140, Data Transfer Logic 145, State Logic 155, and/or Setup Logic 160. Alternatively, these logic elements (e.g., the downloadable software) may be provided as a bundle along with a third-party application. For example, it is possible that these logic elements are stored on a server in conjunction with one or more applications such as Instagram™, Facebook™, SnapChat™, etc. The logic elements illustrated in FIG. 1 may be downloadable as an add-on to these various third-party applications.

In some embodiments, a shortcut-key included in a virtual keyboard is configured to copy a link into an input field of Base Applications 120. This link is optionally configured for download an application to a user that receives the link via Base Applications 120. For example, using a shortcut-key, the link may be placed in an input field of Base Application 120A at Computing Device 110A and from this input field the link is communicated to Computing Device 110B via Network 115. The link is configured to be selected at Computing Device 110B and to provide a user of Computing Device 110B an option to download an application and/or data. For example, the link is optionally used to provision an associated application on Computing Device 110B.

In various embodiments, the link is configured to download a combination of Interface Adaption Logic 140, Data Transfer Logic 145, State Logic 155, and/or Setup Logic 160. For example, the Hyperkey Chat 2.0™ application is configured to provide a virtual keyboard including a shortcut-key on a first computing device. This shortcut-key is configured for providing a link to a user of a second computing device. The link is configured for downloading the Hyperkey Chat 2.0™ application on the second computing device. In another example, a popular application, e.g., SnapChat™ including a combination of the various logical elements discussed above, is configured to generate a virtual keyboard having a shortcut-key for providing a ling to a user of a second computing device. This link is configured for providing an instance of the SnapChat™ application (with or without the various logical elements) to the second computing device. This greatly simplifies the sharing of applications between users.

A virtual keyboard can include one or more shortcut-key configured to provide links from a first user to a second user. The links may each be configured to provide the second user with a different application or different suite of applications. Further, the links provided to the second user may also, or alternatively, be configured for accessing other types of content. For example, a link may be configured for connecting the first and second users in a social network. A link may be configured for providing contact information of the first user to the second user. A link may be configured for providing a payment and/or a prepaid item. A link may be configured for providing a song, video, software, images, user identifier, account identifier, passcode, and/or the like.

In some embodiments, selection (e.g., clicking on) a shortcut-key configured to provide a link to a second user results in automatic copying of the link from Storage 165 to an input field of Base Application 120A. In some embodiments, selection of a shortcut-key results in copying of the link to a copy/paste buffer of Operating System 135 or Base Application 120A. In this case a "Paste" operation can then be used to copy the link from the buffer to the input field.

Computing Devices 110 optionally further include Keyboard Logic 163. Keyboard Logic 163 is configured to present a virtual keyboard with Display 130. For example, the Virtual Keyboard 215 discussed elsewhere herein. Keyboard Logic 163 optionally includes or makes use of operating system functions on Computing Device 110. The virtual keyboard can include a plurality of shortcut keys configured for executing different members of a plurality of additional applications. These applications are optionally executed within an area of Display 130 previously occupied by the virtual keyboard and/or the plurality of shortcut keys.

In some embodiments, Base Application 120A includes a messaging application including a first text input field configured to receive keystrokes from the virtual keyboard. For example, iMessage® and Facebook® messenger each have a text input field in which text or other content can be entered to create an MMS message.

Optionally the virtual keyboard includes a second text input field, distinct from the first text input field of the base application. This second text input field may be generated and/or managed by User Interface Logic 172. Both the first and second text input fields are optionally displayed at the same time, as they have different purposes.

Content entered into the second text input field can be used to perform searches using different Dependent Applications 125, responsive to which shortcut keys are selected by a user. For example, after a search term is entered in the second input field a user may select shortcut keys associated with YouTube or Yelp in order to automatically retrieve content from one of these services, respectively. As such, each of the shortcut keys may be configured to send content entered in the second text input field as a search term to a different application. Such a search on a single application is referred to as a "single application search" herein.

User Interface Logic 172 is optionally configured such that the contents of the second text input field may be used to initiate a search of multiple Dependent Applications 125 in parallel. Such a search is referred to herein as a "global search." A global search is a search of two, three, four or more applications using the same content entered in an input field. In a global search the content is used to retrieve (e.g., through different API calls over Network 115) content from more than one application in response to a single request from a user. A global search may be initiated using a single control, e.g., input button, presented on Display 130 by Interface Logic 172. User Interface Logic 172 may be configured to then present the retrieved content together to the user in a single window. Results of searching multiple third-party applications can be displayed together at the same time, optionally within a keyboard interface.

User Interface Logic 172 may be used to present the second text input field and to provide the functionality taught herein, in multiple Base Applications 120, e.g., multiple messaging applications.

In some embodiments, the first and second text input fields are combined into a single text input field. This single text input field having the functionality described herein with respect to both the first and second text input fields. Specifically, the single text input field is optionally to perform both global or single application searches. User Interface Logic 172 may be configured such that the functionality of the single text input field is user selectable using different shortcut keys. For example, the single text input field may be configured to receive content (e.g., text, links, images, emojis, etc.) in to be included in an SMS or MMS message communicated by the underlying messenger. The content being included in the message in response to a "Send" key included on the keyboard. The same text input field may also be configured to receive content (e.g., text, links, images, emojis, etc.) to be included in a global search using one or more Dependent Applications 125. The content being used as a search term in response to selection of one of the shortcut keys. Specifically, text entered in the single text input field may be used to search the "Yelp" application if a user selects a Yelp shortcut key following entry of the text. Text entered may be used as a search term to search multiple applications (in parallel) in response to the user selecting a "search" key following entry of the text in the single text input field. Data Transfer Logic 145 is optionally configured to transfer search results into the single text input field, for inclusion in a message.

In some embodiments, User Interface Logic 172 is configured such that the functionality of a shortcut key is dependent on whether the second (or first) text input field includes content. For example, if the second text input field is empty, selection of a shortcut key results in display of an adapted user interface to the Dependent Application 125 associated with that particular shortcut key. Specifically, selection of a Yelp shortcut key will result in display of an adapted user interface to the Yelp application if the second text input field is empty. This adapted user interface to the Yelp application will typically include a text entry field to search Yelp. In contrast, if the second text input field is not empty, then selection of a shortcut key results in a single application search on the Dependent Application 125 associated with that shortcut key, the search being based on the contents of the second text input field. Specifically, if the word "pizza" is in the second text input field, selection of a Yelp shortcut key will result in a search of the Yelp application, and receipt/display of the resulting Yelp content related to pizza. A user may, thus, enter text in the second text input field and choose which specific Dependent Application 125 to perform using the text, or chose to perform a global search on more than one of Dependent Applications 125. A global search is optionally initiated using a separate input control, e.g., a search button.

In response to a global search, content from multiple Dependent Applications 125 can be received at Computing Device 110A. User Interface Logic 172 is typically configured to display this content received from multiple Dependent Applications 125 in a single interface. For example, results from Yelp™, Youtube™ and Tenor™ may all be displayed in a single interface. In some embodiments, this interface is scrollable in a first direction to view content from different sources and scrollable in a second direction to view additional content from a specific source. The displayed content is user selectable and may be transferred to Base Application 120A using Data Transfer Logic 145. The displayed content may also be selected by a user to view additional details. For example, a user may open an item of Yelp content to view further details—within the area of Display 130 previously occupied by the adapted user interface, by the QWERTY keyboard, and/or one or more of the shortcut keys.

In some embodiments, User Interface Logic 172 is configured to automatically populate the second text input field with potential search terms, or if a single text input field is present to highlight text entered in the single text input field as a possible search term. This functionality may be responsive to keystrokes entered by a user in the first or second text input fields. For example, if a user types "pizza" this word may be a candidate for a global search or a single application search. A word detected as being entered in the first text input field may automatically be transferred/shown to the second text input field. In a specific example, if a user types "let's get some pizza," when the word "pizza" is entered User Interface Logic 172 may recognize "pizza" as a potential search term and give the user an opportunity to perform a global or single application search using that term. The user can then select a specific function key or a global search button to perform their desired type of search.

In some embodiments only selected words or terms are used to automatically populate the second text input field. For example, User Interface Logic 172 may be configured to only transfer (or highlight) words or terms that are in a predefined list. This list may be stored in Storage 197 or Storage 165. If the list is located in Storage 165, then User Interface Logic 172 may compare typed terms with the list without sending keystrokes to Server 195, thus preserving privacy. In some embodiments, User Interface Logic 172 is configured to adapt entered text slightly to generate text more suited for searching. For example, "420" may be changed to "weed."

In some embodiments, User Interface Logic 172 is configured to display search results in an order responsive to the search term used to obtain the search results. For example, if the search term "pizza" is used to perform a search, the results from Yelp may be shown before (above) those results for Spotify™. In some cases, the identities of the Dependent Applications 125 searched are dependent on the search term.

In some embodiments, User Interface Logic 172 is configured to display search results in an order responsive to a process in which third parties pay to have their content shown first. For example, a publisher of a Dependent Application 125 related to food may pay (e.g., bid) to have their results shown first in response to the search term "sushi." Specific search terms may be associated with different third parties for this purpose.

In some embodiments, User Interface Logic 172 is configured to display an advertisement within search results received from multiple Dependent Applications 125. For example, the search term used to retrieve the results and Advertising Logic 162 may be used to select an advertisement, and the selected advertisement may be displayed together in a same scrollable interface with results obtained from multiple third-party sources.

Computing Devices 110 optionally further include Search Logic 173 configured to perform searches of Dependent Applications 125 using contents (e.g., words or terms) of the second text input field. Search Logic 173 may be configured to perform these searches using a separate API for each Dependent Application 125, to perform these searches in parallel, to perform multiple searches in response to a single request, and/or the like. Search Logic 173 is typically initiated to a search by a user selecting shortcut key associated with a specific application or by selecting a global search button associated with more than one application. In some embodiments, Search Logic 173 is configured to receive one or more search terms from the second text input field, to send the search term(s) to at least two different applications in response to a single search request, and to receive search results from the at least two third-party applications. This process may include sending search requests to multiple internet based APIs supported by different third parties.

Computing Devices 110 optionally further include Display Logic 148. Display Logic 148 is configured to display search results within Display 130 of Computing Device 110A. As noted elsewhere herein, these results can include results from at least one, two, three, four, five or more Dependent Applications 125, presented at the same time. In some embodiments, results of a first of at least two different applications (e.g., Dependent Applications 125) are displayed in a group separate from results of a second of the at least two different applications. Optionally, an order of the groups within the same window is dependent on an identity of the search term(s) and/or on a financial arrangement with third parties.

In some embodiments, Display Logic 148 is configured to display an advertisement in the same window, along with the results from the at least two different applications. The advertisement may be from a third-party source, may be paid for in an auction for the search term, and/or may be selected based on the search term(s). The advertisements may be selected using Advertising Logic 162.

In some embodiments, Display Logic 148 is configured to scroll in a first direction to view search results from additional applications, and to scroll in a second direction to view additional search results from one of the at least two different applications. In some embodiments, Display Logic 148 is configured to manage memory available for the display of search results using: 1) a cache of search results from a first of the at least two different applications, and a cache of search result from a second of the at least two different applications. In some embodiments, Display Logic 148 is configured to manage memory available for the display of search results using: 1) a cache of search results to be displayed when a user scrolls in a first direction, and a cache of search results to be displayed when a user scrolls in a second direction. The managed memory is optionally dedicated to keyboard use on Computing Devices 110. In some embodiments, Display Logic 148 is configured to display a control (user input) configured for a user to expand display of search results from a particularly member of the at least two different applications. In various embodiments, Display Logic 148 is configured to display the search results within space occupied by a QUERTY keyboard, occupied by an adapted user interface, occupied by an interface to Base Application 120, and/or occupied by shortcut keys. In some embodiments, Display Logic 148 is configured to display an adapted interface of one of the at least two different applications within space occupied by the virtual keyboard. The interface is optionally adapted to fit within the space at least partially occupied by the virtual keyboard.

Computing Devices 110 optionally further includes Term Detection Logic 150. Term Detection Logic 150 is configured to monitor keystrokes entered by a user of Computing Device 110A. The monitored keystrokes may be used by User Interface Logic 172 to automatically detect possible search terms in text entered by a user. As discussed elsewhere herein, these terms may be highlighted in the entered text and/or automatically use to populate a second text entry field. Analysis of the monitored keystrokes optionally occurs on Computing Device 110A rather than being performed on Sever 195, in order to improve privacy. The keystrokes monitored by Term Detection Logic 150 are optionally detected as they are entered into the first text input field via the virtual keyboard. Term Detection Logic 150 is optionally included as part of User Interface Logic 172. For example, to compare keystrokes entered into the first text input field to predetermined keywords, and to provide keywords that match the keystrokes to User Interface Logic 173 for copying to the second text input field.

Computing Devices 110 optionally further include Update Logic 161. Update Logic 161 is configured to update the predetermined search terms (keywords) stored in Storage 165 using data received from a remote computing device such as Server 195. Update Logic 161 is optionally configured to update the keywords in response to an advertisement bidding system. The update of the keywords can include changing applications associated with each keyword, addition or removal of keywords, and/or the like.

Figure 2:
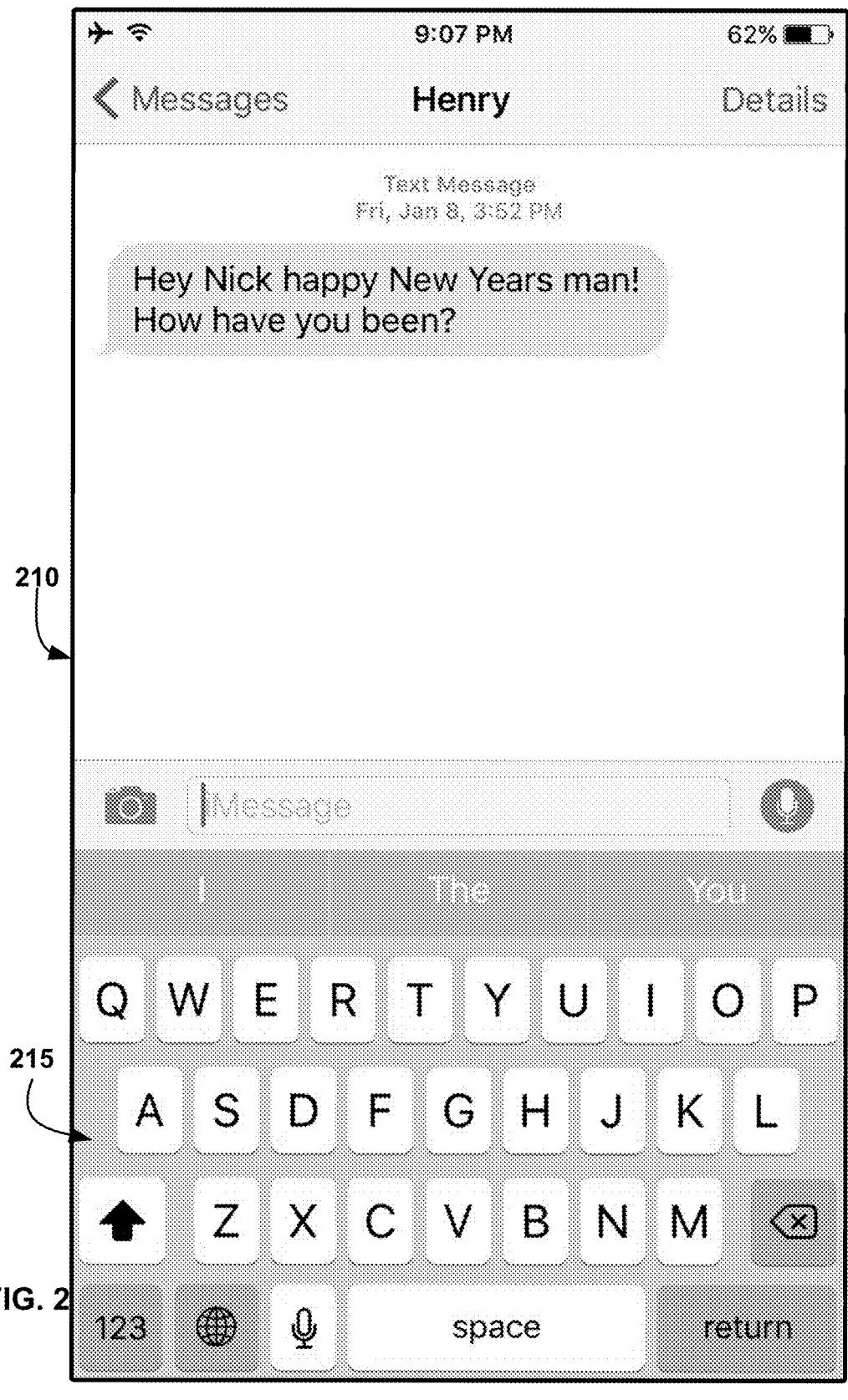
FIG. 2 illustrates a messaging application including a virtual keyboard, according to various embodiments of the invention.

FIG. 2 illustrates a Messaging Application 210 including a Virtual Keyboard 215, according to various embodiments of the invention. This specific example shown is the current default keyboard on the Apple iPhone®. This virtual keyboard is shared as an extension between a variety of iPhone compatible applications and can be exchanged for alternative keyboards having different character sets or a set of graphics (e.g., smileys). These keyboards are provided by the iOS operating system.

Figure 3:
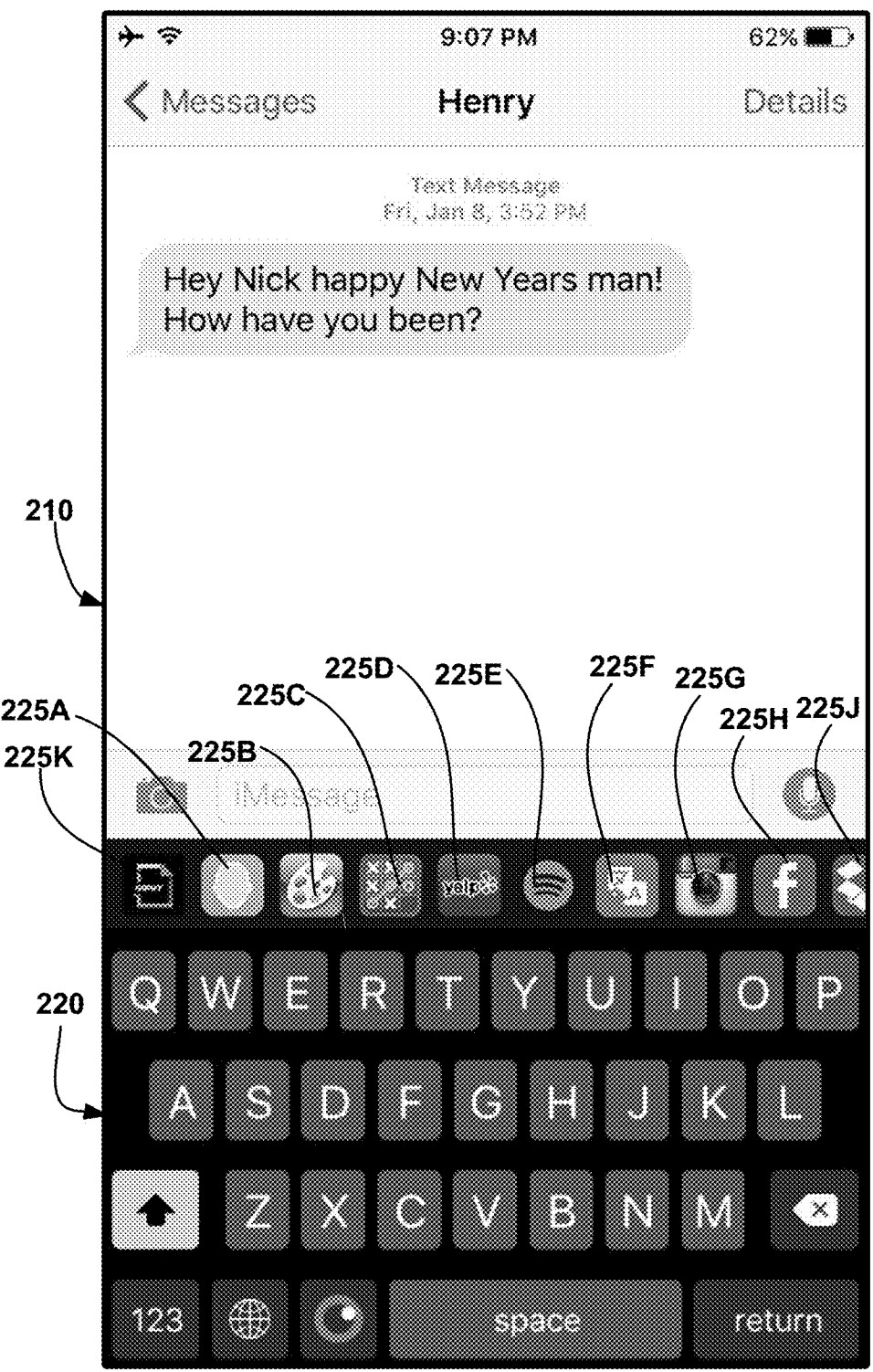
FIG. 3 illustrates a messaging application including an adapted user interface including plurality of shortcut icons, according to various embodiments of the invention.

FIG. 3 illustrates Messaging Application 210 including an Adapted User Interface 220 having plurality of Shortcut Icons 225 (also referred to herein as "shortcut keys"), according to various embodiments of the invention. Each of the Shortcut Icons 225 identifies a shortcut-key of the Adapted User Interface 220. Interface Adaption Logic 140 has been used to replace the Default Interface 215 (e.g., a virtual keyboard) with the Adapted User Interface 220. Each of the Shortcut Icons 225 is configured for execution of a different member of Dependent Applications 125. When one of the Shortcut Icons 225 is touched (or clicked on) by a user, a command is sent to Interface Adaptation Logic 140 to initiate execution of the associated member of Dependent Applications 125 and to replace the Adapted User Interface 220 with a different adapted user interface to the respective member of Dependent Applications 125.

The set of Shortcut Icons 225 illustrated in FIG. 3 optionally represent a menu of Dependent Applications 125 that have been selected by a user using Setup Logic 160. The user may select one, two, three or more Dependent Applications 125 for inclusion in this menu. The Shortcut Icons 225 illustrated represent a messaging application (225A, snap chat), a graphics program (225B, paint), a game (225C, tick-tack-toe), an e-commerce application (225D, Yelp), a music program (225E, Spotify), a translation application (Google Translate, 225F), a photo sharing application (225G, Instagram), a social networking application (225H, Facebook), a GIF application (225K, GIPHY), and a file sharing application (225J, dropbox). Any of these applications may be accessed using an adapted user interface from within the illustrated messaging application. As such, information accessed in these applications can manually or automatically be included in the text exchange of Messaging Application 210. For example, a photo accessed in Instagram can be provided to the input field of Messaging Application 210 and sent as a message using the functionality of Messaging Application 210.

Figure 4:
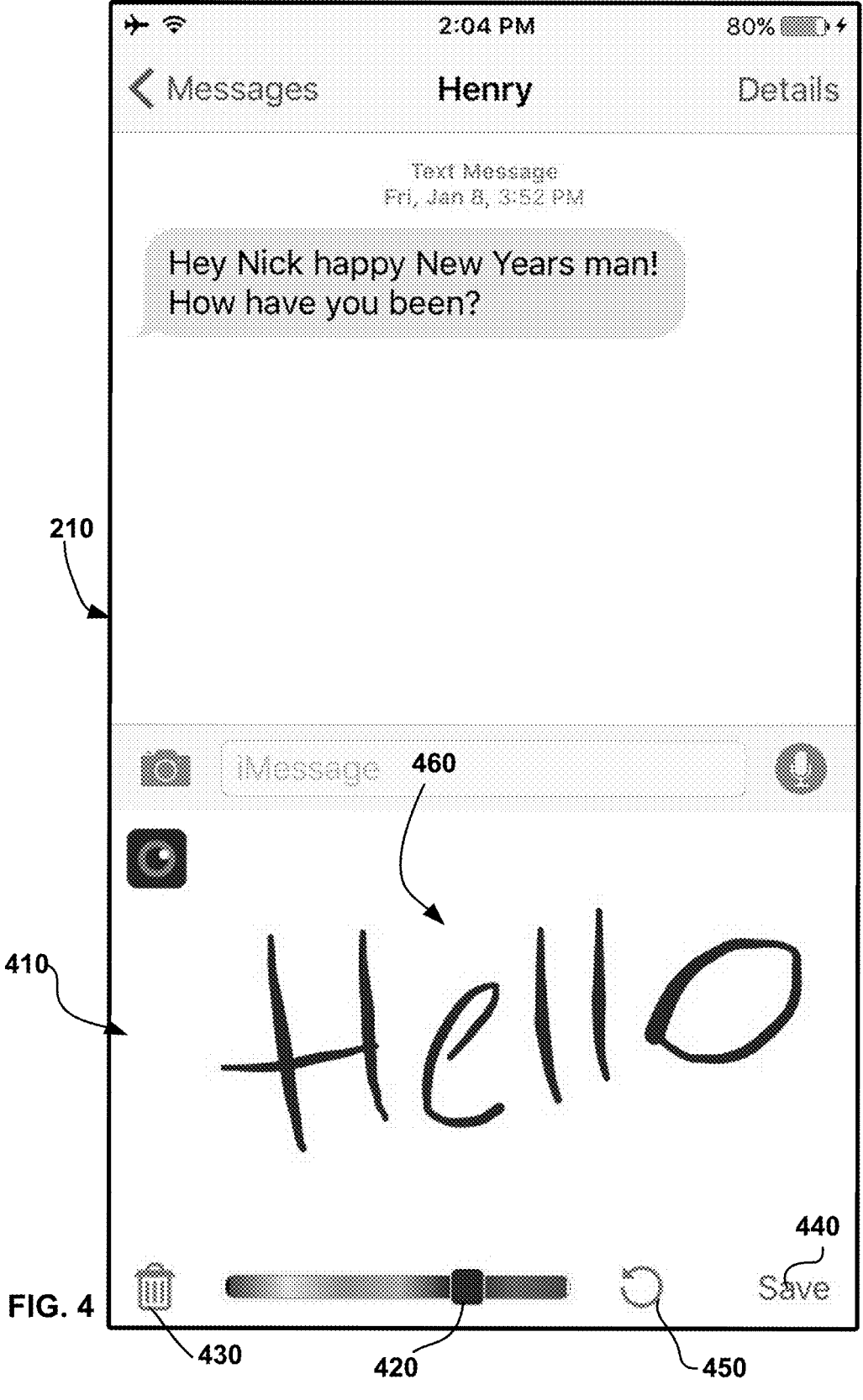
FIG. 4 illustrates a messaging application in which a virtual keyboard has been replaced by a user interface to a graphics application, according to various embodiments of the invention.

FIG. 4 illustrates a messaging application in which a virtual keyboard has been replaced by an Adapted User Interface 410 to a graphics application, according to various embodiments of the invention. Note that Adapted User Interface 410 has replaced the virtual keyboard but not all of the interface of the messaging application, i.e., the prior texts are still shown. As shown elsewhere herein, the adapted user interface may occupy part or all of a prior default interface. In the example illustrated, the adapted interface of the graphics application has replaced the virtual keyboard interfaces illustrated in FIGS. 2 and 3.

The Adapted User Interface 410 of the graphics application optionally provides full functionality of the graphics application. Specifically, the Color Slider Bar 420, Trash Icon 430, Save Button 440 and Reset Icon 460 can each be operated by touching Display 130. In addition the Drawing Field 460, can be used to draw. In the illustrated example the word "Hello" has been drawn in Drawing Field 460 by touching the screen of Display 130. Interface Adaptation Logic 140 is configured to properly match touch locations on Display 130 to the proper input coordinates to the graphics application. Graphical user interface functionality that is dependent on location with Display 130 is, thus, preserved.

Figure 5A:
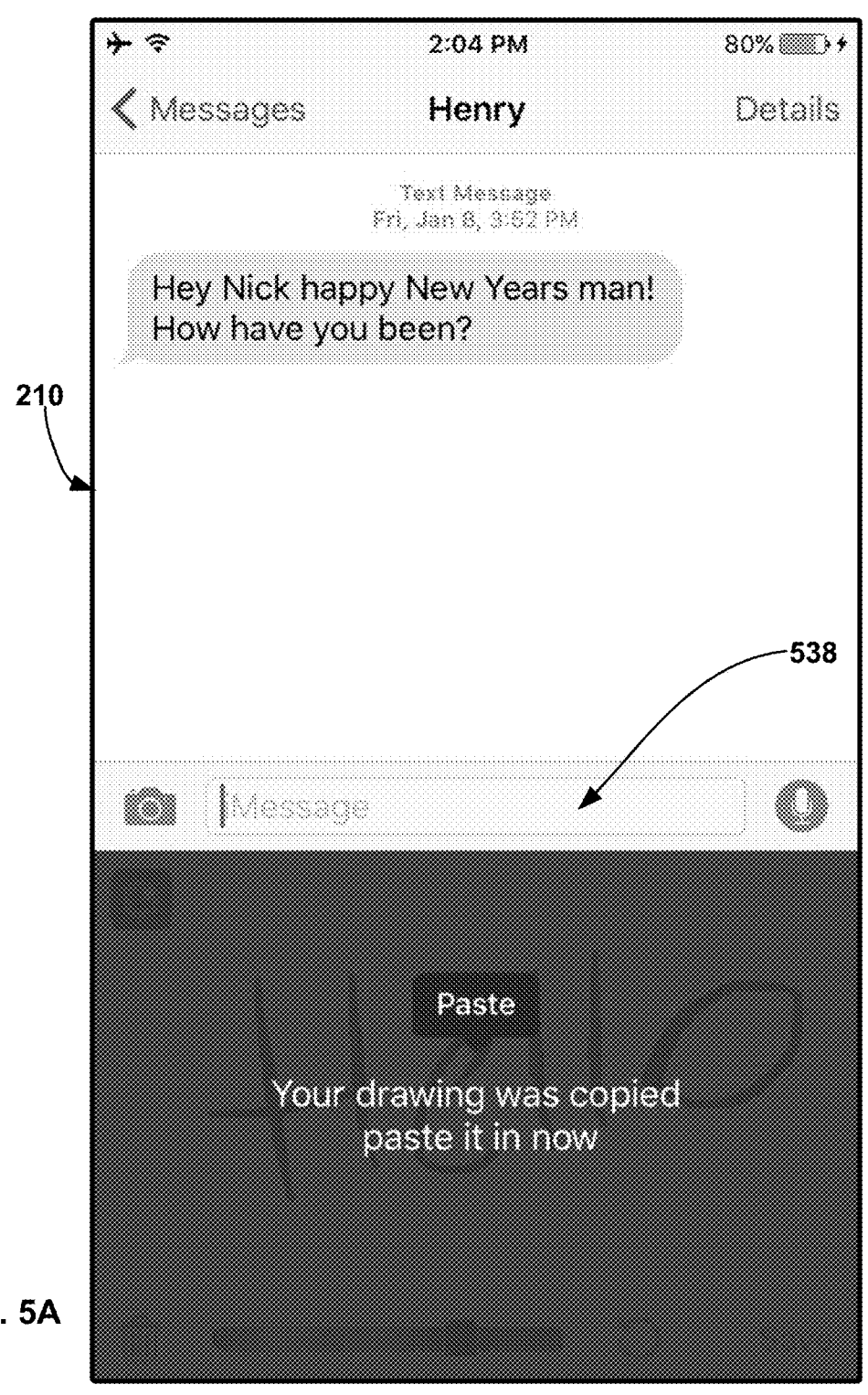
FIGS. 5A and 5B illustrate transfer of a graphic made using the graphics application of FIG. 4 from a dependent application to a base application, according to various embodiments of the invention.
Figure 5B:

FIGS. 5A and 5B illustrate transfer of a Graphic (Hello) 510 hand written using the graphics application of FIG. 4 from Dependent Application 125A to Base Application 120A, according to various embodiments of the invention. The transfer may be manual (as illustrated) or automatic. In manual transfer the output of Dependent Application 125A is copied to the operating system cut/paste buffer and then pasted into the input field of the Base Application 120A. FIG. 5A illustrates an acknowledgement of the copy operation and presentation of a "paste" option. FIG. 5B illustrates the result of the paste option. The graphic image "Hello" has been passed into the Input Field 538 of the messaging application (Base Application 120A) and sent to an external device using the communication features of the messaging application. The image is typically moved from Dependent Application 125A by Data Transferred Logic 145 to a copy/paste buffer where it is then transferred under the control of a user to Base Application 120A using a paste operation.

In automatic transfer of an output of Dependent Application 125A to an input of Base Application 120A the adapted interface mimics a default interface (e.g., a keyboard or GUI) of Base Application 120A. For example, if Base Application 120A is configured to accept characters, gifs and images from the default user interfaces of Base Application 120A, then the adapted user interface of Dependent Application 125A can provide the same data types in place of the default user interfaces. In this example, Data Transfer Logic 145 can move content from Dependent Application 125A to an input of Base Application 120A without requiring further user input.

Figure 6A:
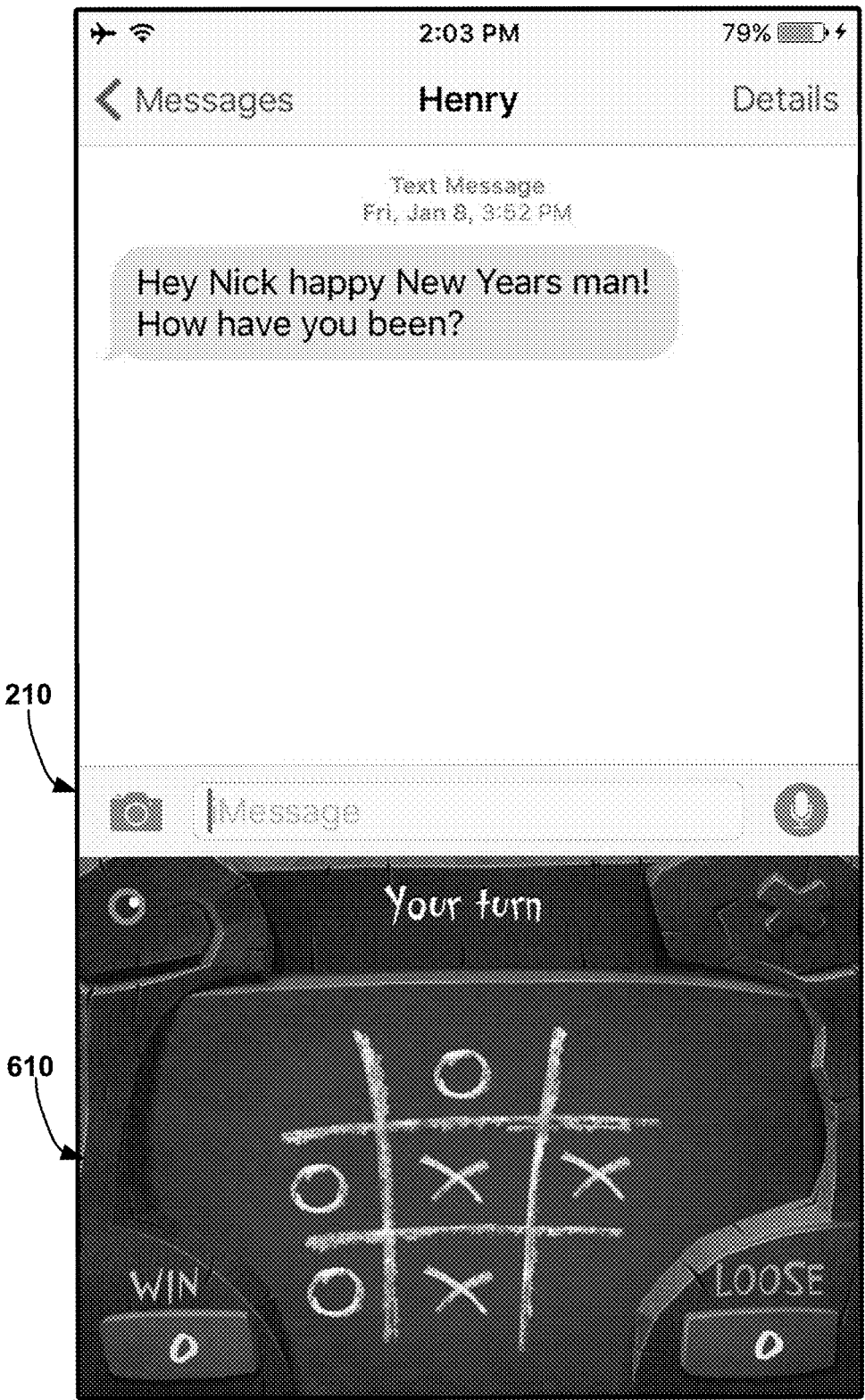
FIG. 6A illustrates a messaging application in which a virtual keyboard has been replaced by an interface to a game application, according to various embodiments of the invention.

FIG. 6A illustrates an instance of Messaging Application 210 in which Default Interface 215 has been replaced by an Adapted User Interface 610 to a (tick-tac-toe) game application, according to various embodiments of the invention. This Adapted User Interface 610 is a touch sensitive interface in which a player can touch locations on Display 130 to place an "X" or an "O". Such a touch results in a change in game state that can be communicated using Data Transfer Logic 145 and/or State Logic 155. The game state may be communicated to Server 195 and/or Computing Device 110B, thus allowing multiple players to play together from different devices. As noted elsewhere herein, this communication can use the communication functionality built into Messaging Application 210 or can be made through a separate communication channel coupled to Dependent Application 125A (which includes the tic-tac-toe game logic). Optionally, the players playing the game of the Dependent Application 125A are the same users that are participating in the chat messaging session of the Base Application 120A. Data Transfer Logic 145 may be configured to identify participants (users or devices) in a communication taking place in Base Application 120A and direct output of Dependent Application 125A to the same users or devices.

Figure 6B:
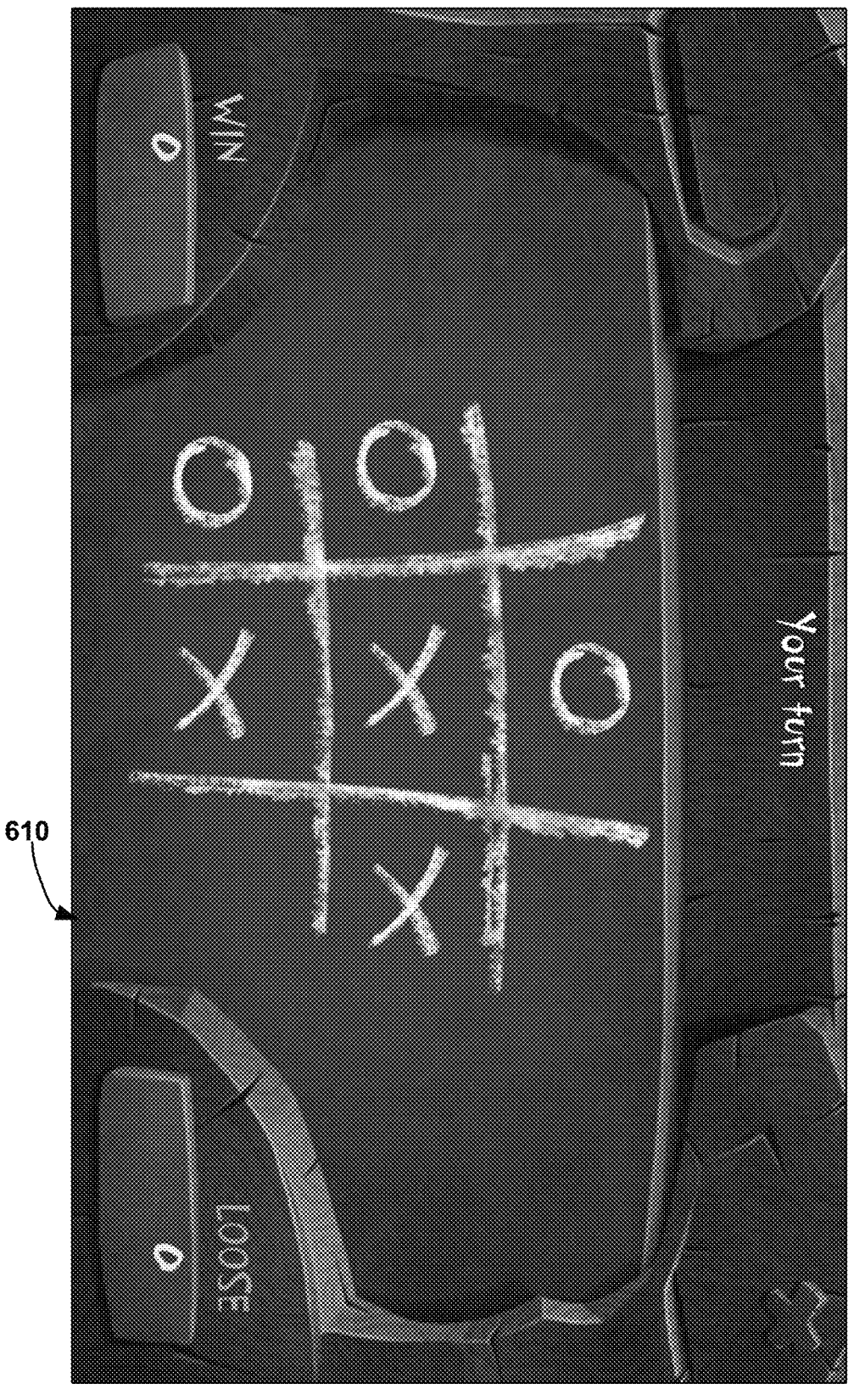
FIG. 6B illustrates the game application interface of FIG. 6, modified in response to a device rotation, according to various embodiments of the invention.

FIG. 6B illustrates the game application interface of FIG. 6A, modified in response to a device rotation, according to various embodiments of the invention. In response to the rotation of Computing Device 110A, the adaption of the user interface to Dependent Application 125A is change to occupy more of Display 130. In some embodiments, the fraction of Display 130 occupied by the adapted interface is changed from less than 33% to more than 90% of the display area.

Figure 7:
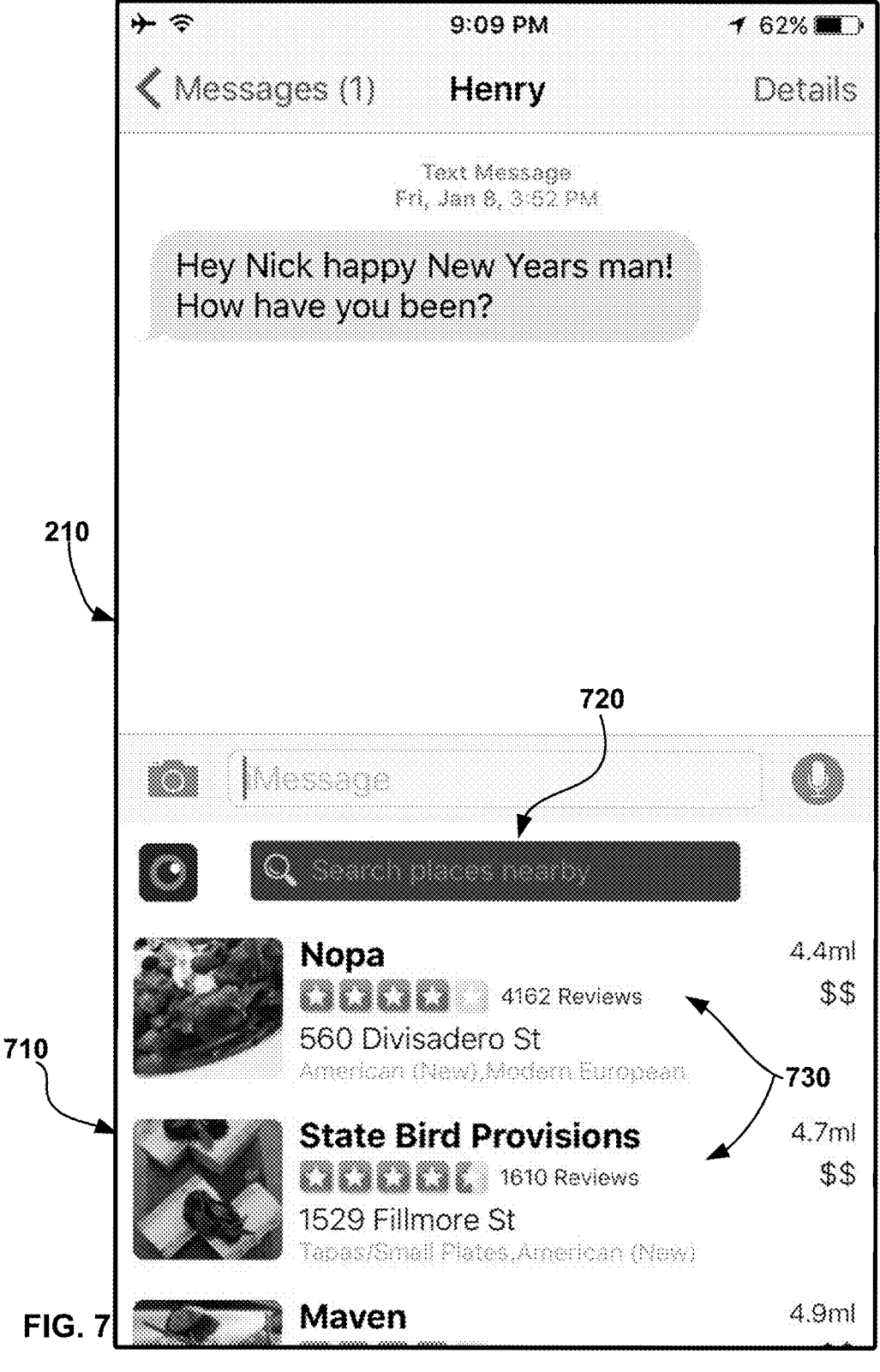
FIG. 7 illustrates an e-commerce interface generated in response to a keyword search, according to various embodiments of the invention.

FIG. 7 illustrates an instance of Messaging Application 210 in which Default Interface 215 has been replaced by an Adapted User Interface 710 to an e-commerce application (Yelp), according to various embodiments of the invention. The instance of Adapted User Interface 710 shown is generated in response to a search on a keyword. It includes a Search Field 720, and a plurality of Active Regions 730 that can be touched (clicked on) to retrieve further content under the control of the Yelp application. If selection of one of Active Regions 730 results in execution of a browser application to view a website, the browser application may be presented to the user within a new adapted user interface (replacing Adapted User Interface 710) or the browser application may be executed directly resulting in closing of Messaging Application 210. The Adapted User Interface 710 illustrated in FIG. 7 and The Adapted User Interface 410 illustrated in FIG. 4 both represent non-keyboard interfaces to third-party applications that replace the default virtual keyboard of Messaging Application 210 and are embodiments of Adapted User Interface 220.

The ability to access a Dependent Applications 125 via an adapted user interface from within Base Applications 120 enables synergistic use of the two applications. An example of such synergy, discussed briefly elsewhere herein, is the use of game applications in conjunction with messaging or social networking applications. A social networking application can be accessed from within a game application and vice versa. This allows reporting of game activity (e.g., posting of a high score) in messaging or social networking. It also allows the playing of games with a user's messaging or social networking contacts. These features are enabled even with third-party messaging or social networking applications.

In some embodiments, the translation is performed using translation logic disposed on Computing Device 110A. Alternatively, all or part of the translation may be performed using a third-party and/or external service. For example, the Text 730 may be provided over Network 115 to an API of the Google Translate™ service provided by Google, Inc. This approach of sending Text 730 to a remote system for processing may be applied to other types of processing text and/or other content. For example, processing may include encryption/decryption, search, changes in font, tagging of images, grammar/spelling correction, conversion to braille, database queries, text replacement (e.g., replacement of a code or acronym with a longer text stream), replacement of text with audio data, replacement of text with image data, voice to text conversion, and/or the like. For example, in some embodiments, Data Transfer Logic 145 is configured to send text entered in Adapted User Interface 710 to a text-to-audio conversion service on Server 195. In response, audio data is received by Computing Device 110A and provide to Input Field 538 of Base Application 120A. Both the received audio and the original text are optionally communicated to a remote destination using Base Application 120A. In another example, an image provided to Adapted User Interface 220 is sent to a remote imaging tagging service. In response, image tags, characterizing content of the image, are received by Computing Device 110A. These tags may be communicated to Computing Device 110B (with or without the image) by Base Application 120A. These tags may be used to classify the user of Computing Device 110A, e.g., this user has an interest in motorcycles. These tags may be used to select advertisements for presentation to the user. These advertisements can include Shortcut Icons 225 displayed on Adapted User Interface 220. These tags may be stored as a "cookie" on Computing Device 110A. In another example, search term (s) provided to Adapted User Interface 220 are sent to a remote query system. This remote query system may be configured to retrieve (and return to Computing Device 110A) a wide variety of search results, including but not limited to, for example, internet search results, products, social media content/profiles, podcasts, coupons, images, books, music, services, locations, maps, video, businesses, people, web pages, documents, financial services, e-commerce items, and/or the like.

In some embodiments, Dependent Application 125A is configured for purchasing products or services. For example, Dependent Application 125A may be associate with a commercial website or enterprise, and configured to make purchases therefrom. Using embodiments of Computing Device 110A a purchased product or service may be provided to a user of Computing Device 110B. In a specific example, a first user can access an embodiment of Dependent Application 125A configured for purchasing flowers, the access being through an Adapted User Interface 220 of Base Application 120A. The first user uses this embodiment to purchase flowers and when the purchase is complete is provided with a link that indicates that the flowers have been paid for. The first user then automatically or manually places this link in an input field of Base Application 120A. From the input field the placed link is communicated to Computing Device 110B using communication features of Base Application 120A. At Computing Device 110B, the link can be used to provide an address for delivery of the flowers, choose different flowers, etc. Purchases can include any of the products or services discussed herein, including Dependent Applications 125.

Figures 8, 9:
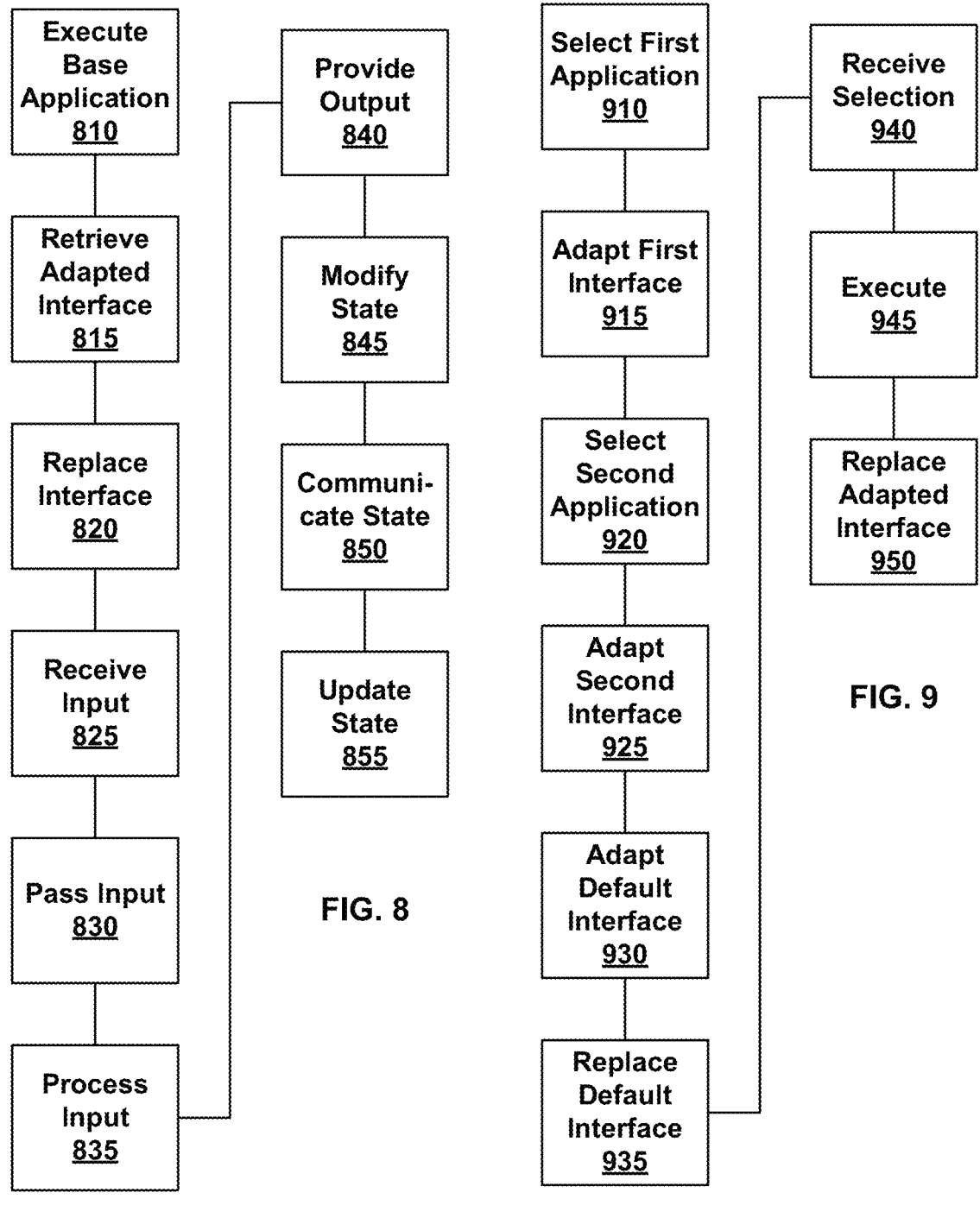
FIG. 8 illustrates a method of executing an application, according to various embodiments of the invention.
FIG. 9 illustrates a method of executing an application from a virtual menu, according to various embodiments of the invention.

FIG. 8 illustrates a method of executing an application, according to various embodiments of the invention. In this method, Dependent Application 125A is accessed from within Base Application 120A via an adapted user interface. A user input provided through the adapted user interface is optionally used to update a state of Dependent Application 125A and this updated state may be communicated to other Computing Devices 110 and/or Server 195. The method illustrated in FIG. 8 is optionally performed using Computing System 100. The steps illustrated in FIG. 8 are optionally performed in different orders.

In an Execute Base Application Step 810, Base Application 120A is executed on Computing Device 110A. The execution is supported by Operating System 135 and may include use of a default user interface provided by Operating System 135. For example, Base Application 120A may receive a virtual keyboard interface from Operating System 135 as an application extension.

In a Retrieve Adapted Interface Step 815, an adapted user interface is received by Base Application 120A. The received interface is typically adapted and provided by Interface Adaption Logic 140. The received interface is optionally adapted from a default interface of Dependent Application 125A and adapted to replace all or part of the default interface of Base Application 120A. For example, the adapted user interface may be adapted to replace the virtual keyboard received from Operating System 135. The types of adaptation that may be made to the user interface can include any of the adaptations discussed elsewhere herein. The adapted user interface may include a keyboard or may be a non-keyboard user interface.

The adapted user interface is optionally received from a source external to Base Application 120A. For example, the adapted user interface is typically received from Interface Adaptation Logic 140 rather than originally from Operating System 135. In some embodiments, the adapted user interface also includes at least one functional link to Dependent Application 125A. As used herein, the term "functional call" means that the adapted user interface is configured to execute a function within Dependent Application 125A, configured to exchange data with Dependent Application 125A, configured to pass a user input to a function within Dependent Application 125A, and/or configured to receive an output from a function of Dependent Application 125A. In various embodiments, the adapted user interface includes 1, 2, 3 or more functional calls to Dependent Application 125A. As discussed elsewhere herein, Data Transfer Logic 145 may be configured to transfer a link to an input field of Base Application 120A. This link optionally includes data configured to be operated on by an external application.

In a Replace Interface Step 820, all or part of the default user interface of Base Application 120A is replaced by the adapted user interface received/retrieved in Retrieve Adapted Interface Step 815. The adapted user interface is added to the Base Application 120A such that the Base Application 120A can treat the adapted user interface as the replaced default user interface. For example, Base Application 120A may receive inputs originated at the adapted user interface and process these inputs as if they were received from a default interface. Optionally, the adapted user interface is adapted to communicate to the same API of Base Application 120A as the default user interface (of Base Application 120A) provided by Operating System 135.

In a Receive Input Step 825, an input from a user is received at the adapted user interface. This occurs while the adapted user interface is display within Base Application 120A. The input may be a touch to Display 130 that is interpreted to be at a specific location within the adapted user interface by interface Adaptation Logic 140. For example, the input may be a touch at a location of an icon or a key of a virtual keyboard. In alternative embodiments, the input can include an image, audio data, the result of a paste operation, and/or the like.

In a Pass Input Step 830, the input received in Received Input Step 825 is passed to Dependent Application 125A. This may be accomplished using Interface Adaptation Logic 140 and/or Data Transfer Logic 145. The input is optionally modified by Data Transfer Logic 145 prior to being provided to Dependent Application 125A. For example, Data Transfer Logic 145 may be configured to perform a remapping of screen coordinates, to remove metadata from and/or add metadata to the input, and/or to perform some other transformation on the input data.

In a Process Input Step 835, the input received in Pass Input Step 830 is processed using functions of Dependent Application 125A. These functions are typically default functions of Dependent Application 125A. For example, these functions can be functions used by Dependent Application 125A when Dependent Application 125A is executed as an independent standalone application (e.g., directly through Operating System 135, not through one of Base Applications 120). Optionally, the processing results in an output of Dependent Application 125A. This output can include text, commands, images, gifs, graphics, audio, and/or any other data type.

In a Provide Output Step 840, the output of Dependent Application 125A is provided to a user via the adapted user interface, to State Logic 155, to Computing Device 110B, to Server 195, to Base Application 120A, and/or the like. For example, in some embodiments, the output of Dependent Application 125A is provided to the default user interface of Base Application 120A, e.g., to an API of Base Application 120A.

In an optional Modify State Step 845, a state of Dependent Application 125A is modified based on the user input received in Receive Input Step 825. The state may be modified before or after Process Input Step 835. In one example, the state of a game application is modified based on processing of a user input received at the adapted user interface.

In an optional Communicate State Step 850, the modified state of Dependent Application 125A is communicated to Computing Device 110B. This communication may be via Network 115, may be via a communication function of Dependent Application 125A, and/or may be via a communication function of Base Application 120A. All or part of the modified state may be communicated. The modified state is optionally communicated via Server 195.

In an optional Update State Step 855, the state of an application executing on Computing Device 110B is updated using the state information received in Communicate State Step 850. For example, an instance of Dependent Application 125A executing on Computing Device 110B may be updated based on state information received from Computing Device 110A. In some embodiments, Update State Step 855 is used to synchronize the state of a computer game on a plurality of different Computing Device 110B.

FIG. 9 illustrates a method of executing Dependent Application 125A from a virtual menu, according to various embodiments of the invention. The virtual menu is optionally included in a first adapted user interface within Base Application 120A. When Dependent Application 125A is executed, the first adapted user interface may be replaced by a second adapted user interface within Base Application 120A. The second adapted user interface being an interface to Dependent Application 125A. The steps illustrated in FIG. 9 are optionally performed in different orders.

In a Select First Application Step 910, a first application is selected from a plurality of applications. The plurality of applications may include third-party applications installed on Computing Device 110A. The plurality of applications may also include default applications (default to Computing Device 110A), such as a browser application, test messaging application, e-mail application, music application, camera application, and/or phone application, which come installed on Computing Device 110A.

In an Adapt First Interface Step 915, a user interface of the first application is adapted for use within Base Application 120A. As is described elsewhere herein, adaption of a user interface may include a variety of modifications to the interface and may include the use of one or more adaptation templates. The adapted user interface, and/or rules found to result in a successful adaptation of the user interface are optionally stored in Storage 165.

In an optional Select Second Application Step 920, a second application is selected from the plurality of applications. Select Second Application Step 920 is typically performed in a manner similar to Select First Application Step 910 and may be performed contemporaneously with Step 910. Select First Application Step 910 and Select Second Application Step 920 are optionally performed using Setup Logic 160. The selections are optionally made by viewing a list of installed and/or compatible applications and choosing those that the user wishes to use as Dependent Applications 125A. In some embodiments, the selection is limited to applications that have been previously confirmed as having a user interface that is compatible with adaptation for inclusion within Base Application 120A.

In an optional Adapt Second Interface Step 925, a user interface of the second application is adapted for use within Base Application 120A. Adapt Second Interface Step 925 is similar to Adapt First Interface Step 915. In various embodiments, three or more applications are selected and their user interfaces adapted for use within Base Application 120A.

In an Adapt Default Interface Step 930, a default user interface of Base Application 120A is adapted by inclusion of a menu for selection of the first application and optionally the second application (and optionally further applications). This menu may take the form of a set of Shortcut Icons 225 such as those illustrated in FIG. 3. Each of the Shortcut Icons 225 are configured such that their selection will result in execution of the associated application, for example as Dependent Application 125A.

In a Replace Default Interface Step 935, the default user interface of Base Application 120A is replaced by the adapted version of this user interface. An exemplary result of Replace Default Interface Step 93 can be seen by comparing FIGS. 2 and 3. In these figures, Default Interface 215 has been replaced by Adapted User Interface 220 within an instance of Base Application 120A that includes a messaging application. The Adapted User Interface 220 includes Shortcut Icons 225 to a variety of different applications.

In an optional Receive Selection Step 940, a user selection of the first application is received at the adapted user interface of Base Application 120A, e.g., at Adapted User Interface 220. This selection may be made by the user clicking on the one of Shortcut Icons 225 associated with the first application. The selection is passed to Data Transfer Logic 145, Interface Adaptation Logic 140, and/or Setup Logic 160.

In an optional Execute Step 945, the first application is executed as Dependent Application 125A. The user interface to the first application is the adapted user interface generated in Adapt First Interface 915. In some embodiments, Adapt First Interface Step 915 is performed in response to Execute Step 945.

In some embodiments, Execute Step 945 results in insertion of a link into an input field of Base Application 120A or copying of a link to a copy/paste buffer within Computing Device 110A. As noted elsewhere herein, this link can include a wide variety of information and is optionally configured for sharing of an application, a product, a service, and/or data. For example, the link may be configured for communicating contact information and/or sharing Dependent Application 125A.

In an optional Replace Adapted Interface Step 950, the adapted default interface of Base Application 120A (which replace the default interface in Replace Default Interface Step 935) is replaced by the adapted user interface of the first application (which was adapted in Adapt First Interface Step 915). In Replace Adapted Interface Step 950 one adapted user interface that includes a menu of applications is replaced by an adapted user interface to one of those applications. In a specific example, the Adapted Default Interface 220 illustrated in FIG. 3 may be replaced by the Adapted User Interface 710 illustrated in FIG. 7 or the Adapted User Interface 410 illustrated in FIG. 4.

Following Replace Adapted Interface Step 950, steps illustrated in FIG. 8 are optionally executed. For example, Steps 825-855 may be performed using the adapted interface to Dependent Application 125A.

Figure 10:
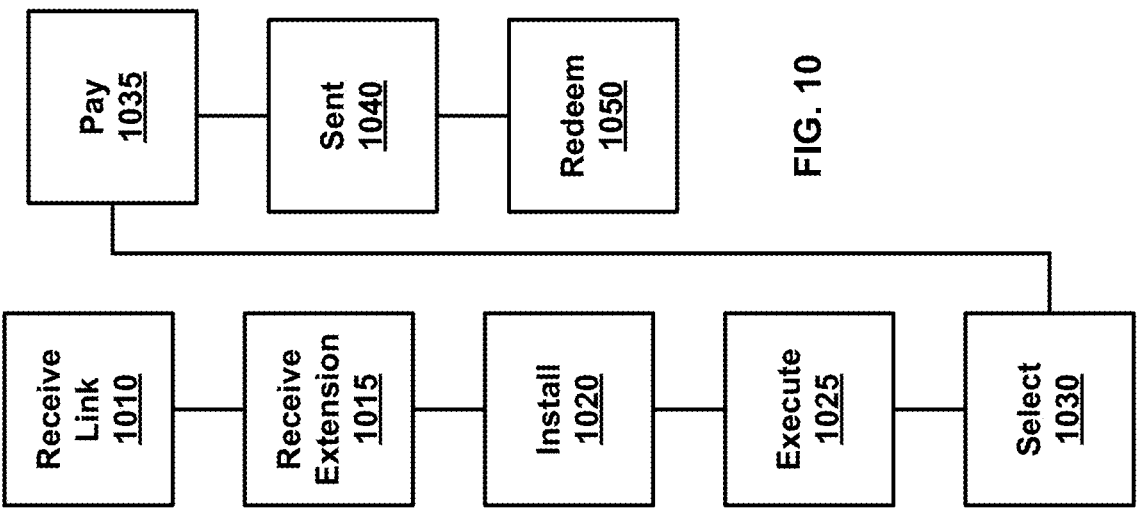
FIG. 10 illustrates a method of sharing an application using a virtual keyboard, according to various embodiments of the invention.

FIG. 10 illustrates a method of sharing an application using a virtual keyboard (e.g., Adapted User Interface 220), according to various embodiments of the invention. This method is optionally used to share applications between Computing Devices 110. The method includes passing of a link from Computing Device 110A to Computing Device 110B. The link is configured for provisioning the shared application on Computing Device 110B and/or for accessing the shared application from Computing Device 110B. The link is optionally communicated from Computing Device 110A to Computing Device 110B via a text messaging application and/or via an Adapted User Interface 210. The methods illustrated by FIG. 10 are optionally adapted for sharing products or services other than applications.

In an optional Receive Link Step 1010 a link is received at Computing Device 110A. The received link is configured for provisioning an application including Interface Adaptation Logic 140 and/or Data Transfer Logic 145 on Computing Device 110A. The application may have a primary purpose of providing the keyboard extension discussed herein. Alternatively, the application may have some other purpose and Interface Adaptation Logic 140 and/or Data Transfer Logic 145 are included as an optional feature or extension. For example, the received link may be configured for downloading the LinkedIn mobile client on Computing Device 110A and this client is downloadable in a package that includes State Logic 155, Setup Logic 160, Keyboard Logic 163, Search Logic 173, Term Detection Logic 150, Interface Adaptation Logic 140 and/or Data Transfer Logic 145. The received link is optionally further configured for provisioning Dependent Application 125A or Base Application 120A. The link received in Receive Link Step 1010 is optionally received via a social networking, text messaging or e-mail application. The link may be to an FTP (file transfer protocol) site, to a webpage configured for downloading the application, or to a redirection site. Receive Link Step 1010 is optional as Interface Adaptation Logic 140 and/or Data Transfer Logic 145 may alternatively be selected from a website or a portal such as the iTunes store, etc.

In a Receive Extension Step 1015 a keyboard extension is received at Computing Device 110A. The keyboard extension includes at least Interface Adaptation Logic 140 and/or Data Transfer Logic 145, and optionally includes State Logic 155, Setup Logic 160, Keyboard Logic 163, Search Logic 173, Term Detection Logic 150, and/or Display Logic 148. The keyboard extension may be received as a standalone program, e.g. the HyperKey application, or as an optional feature of another application. The keyboard extension is optionally received in a package that also includes Dependent Application 125A or Base Application 120A. The keyboard extension may be received from a portal such as the iTunes store or Google App Store. The keyboard extension may be received as a result of selecting a link received in Receive Link Step 1010.

The keyboard extension is configured for presenting Adapted User Interface 220 within Base Application 120A. The keyboard extension includes one, two or more Shortcut Icons 225 configured for accessing Dependent Applications 125A and/or 1256 from within Adapted User Interface 220. The Adapted User Interface 220 having replaced Default Interface 215 of Base Application 120A. In some embodiments, one of the Shortcut Icons 225 is an instance of Shortcut Icon 225M. One or more of the Shortcut Icons 225 are configured for placing a link into and input field of Base Application 120A. For example, Shortcut Icon 225M may be configured for placing a link into the Input Field 538.

In an Install Step 1020 the keyboard extension is installed on Computing Device 110A. The installation optionally includes use of Setup Logic 160 to select which Shortcut Icons 225 should be displayed within Adapted User Interface 220. In some instances of Computing Device 110A Install Step 1020 includes selection of the keyboard extension as one of a plurality of alternative keyboards. Install Step 1020 can include installation on Computing Device 110A of any application associated with a link that can be copied into an input field of Base Application 120A.

In an Execute Step 1025, Base Application 120A is executed on Computing Device 110A. As noted elsewhere herein, Base Application 120A may be a messaging application, an e-mail application, a social networking application, and/or the like. Execution of Base Application 120A results in presentation of Adapted User Interface 220 on Display 130.

In a Select Step 1030, one of Shortcut Icons 225 is selected (e.g., clicked on) from within Adapted User Interface 220. As noted elsewhere herein, this selection can result in automatic copying of a link to an input field of Base Application 120A, or copying of the link to a copy/paste buffer. The link is optionally configured for provisioning of an application on an instance of Computing Device 110B, or providing any of the other tasks discussed herein. The application to be provisioned can be Base Application 120A, Dependent Application 125, an application whose primary purpose is to provide Interface Adaption Logic 140 and/or Data Transfer Logic 145, and/or any other application executable on Computing Device 110B.

In some embodiments, the application for which the link is configured to download is a social networking application such as the mobile clients of Snapchat™, Instagram™, Facebook™, LinkedIn™, and/or the like. In these embodiments the link is optionally configured to provision the social networking application and/or any parts of the keyboard extension illustrated in FIG. 1, e.g., Interface Adaptation Logic 140 and/or Data Transfer Logic 145, etc. In these embodiments, the link shared via the methods illustrated by FIG. 10 can include a link to a specific account. For example, the link can include a link to download the LinkedIn mobile application and/or a link to the user of Computing Device 110A's personal LinkedIn account. The link optionally includes a predesignated acceptance of a social relationship. As such, a first user of Computing Device 110A can send, to a second user of Computing Device 110B, a link to the first user's social networking account, where that link optionally includes a pre-approved acceptance of a social relationship (e.g., a friend request acceptance). Such embodiments can be applied to other types of social networking accounts such as music sharing and or image sharing accounts. In another example, a YouTube user may provide a link to the user's YouTube account that optionally includes a preapprove acceptance to follow that account.

In an optional Pay Step 1035, the user of Computing Device 110A provides consideration (e.g., payment) for a transaction. The consideration can include a cash payment, a credit card payment, an electronic funds transfer, in kind services, a trade, and/or the like. The payment is optionally made using Dependent Application 125B. For example, payment may be made using a mobile Paypal™ agent accessed via an Adapted User Interface 220 of Base Application 120A.

In some embodiments, multiple Dependent Applications 125 may be accessed via one Adapted User Interface 220. For example, an Adapted User Interface 220 may at the same time, or at alternative times, provide an interface to both Dependent Application 125A and Dependent Application 125B. In a specific example, Adapted User Interface 220 may provide an interface to a shopping application and a payment application at the same time or interchangeably. This allows the payment application to be used in a transaction for the shopping application.

A link provided to the input field of Base Application 120A can include payment data indicating the consideration for a product or service has been prepaid, e.g., prepaid by the sender. Likewise, the link may include a coupon, partial payment, discount code, and/or advertisement.

In a Send Step 1040, the link provided to the input field of Base Application 120A is communicated to Computing Device 110B using communication protocols/channels of Base Application 120A. For example, if Base Application 120A is a text messaging application then the link is communicated to Computing Device 110B using text messaging functions. The link may be sent as a text string, as a multi-media message, etc.

In an optional Redeem Step 1050, the link is used at Computing Device 110B to receive a product or service associated with the link. This may include, for example, opening a download or order page of a website or client application. For example, Redeem Step 1050 may include opening an iTunes client and downloading an application, music and/or other content associated with the link from within iTunes. Alternatively, Redeem Step 1050 may include opening a webpage configured to download a product or to provide a service. For example, a webpage may be configured for a user to provide a delivery address for flowers paid for in Pay Step 1035.

In Redeem Step 1050 the link provided to Computing Device 110B may be used to provision Dependent Application 125A and/or another application on Computing Device 110B. Provisioning optionally includes downloading and installing. For example, the link may be used to retrieve an application from a remote server. The link may be used to provision Interface Adaptation Logic 140 and/or Data Transfer Logic 145 on Computing Device 110B. These logics may be provisioned with or without other applications.

In some embodiments, Redeem Step 1050 includes fetching data from a remote data source or providing data to a remote destination. For example, in some embodiments the link is used to retrieve contact information, a video, images, documents, and/or other content. In these embodiments, the link optionally includes credentials configured to allow access to secure information. Likewise, the link may provide identification of a specific account to a social networking service, optionally along with a pre-approval to connect (e.g., establish a relationship) to that account.

In some embodiments, Redeem Step 1050 includes completing an order, providing a delivery address, or paying for a product or services. This may result in delivery of a product or service to users of Computing Devices 110A and/or 110B. Redeem Step 1050 may also result in a transfer of goods, services and/or payments between these users.

In an illustrative example, Dependent Application 125A is a client application for a coupon service such as Groupon.com. Using Adapted User Interface 220 a user executes Dependent Application 125A from within Base Application 120A. The user then selects a coupon from Dependent Application 125A and copies a link into an input field of Base Application 120A. The link may be copied automatically or via a copy/paste buffer. The link includes data identifying the coupon and characteristics thereof. The link can then be communicated via a communication channel of Base Application 120A to Computing Device 110B. At Computing Device 110B a user can optionally use the coupon to obtain a product or service at a discount.

In another illustrative example, Dependent Application 125A is an application related to music, such as Pandora™, iTunes™, Amazon Music or Spotify™. A user of Dependent Application 125A may select a piece of music and pay for the music in Pay Step 1035. Data certifying that the payment has been made and the identity of the music is then placed in an input field of Base Application 120A as a link. When this link is received at Computing Device 110B, the link may be used to retrieve the music, optionally without further cost to a user of Computing Device 110B.

In another illustrative example, Dependent Application 125A is a client application for an online shopping services, such as eBay.com™ or Amazon.com™. A user of Dependent Application 125A may select a product or service for sale through these services, and then pay for the product or service in Pay Step 1035. A link is then placed in an input field of Base Application 120A. The link includes data, e.g., a certificate or key, certifying that the payment has been made and an identifier of the product or service. This link is communicated to Computing Device 110B using Base Application 120A. At Computing Device 110B the link may be used to complete purchase of the product or service. For example, the link may be configured to open an ordering page within a web browser, the page being configured for providing a delivery address and/or acknowledging the payment by the user of Computing Device 110A.

In another illustrative example, Dependent Application 125A is a client application for a social networking service, such as LinkedIn.com™ or Facebook.com™. In these cases, the link can be configured to access a specific account and optionally include a preapproval to establish a relationship to that account. For example, a user of Computing Device 110B may select the link to open a Facebook application and automatically establish a "friends" connection between the user's account and an account of the provider of the link.

The steps illustrated in FIG. 10 are optionally performed in orders other than illustrated in the figure.

In some embodiments a use or production of a link requires logging into an account. For example, providing a link to a social networking account that includes a pre-authorized relationship with that account, may first require the that user of Computing Device 110A successfully log into the account. Likewise, a user of Computing Device 110B that receives the above link may be required to log into their own social networking account before establishing a relationship between their account and an account of the sender. In these embodiments, the functionality of Data Transfer Logic 145 may be dependent on a user's login state to a specific account and/or service, and/or the presence of specific credentials on Computing Device 110A.

In an illustrative example, Dependent Application 125A includes a client configured for accessing the Facebook™ social networking service. If a user of Computing Device 110A is logged into they can access their Facebook account via an Adapted User Interface 220 of Base Application 120A. Within this interface, the user can generate a link to invite others to have a "friends" relationship to their Facebook account, and/or share specific content from their account. The generated link optionally includes credentials granting access to specific content within a Facebook account. Such a link is optionally configured for one-time use or for use only from within another specific Facebook account. The link is optionally communicated from Computing Device 110A to Computing Device 110B using an input field of Base Application 120A.

As used herein, a "link" is meant to include a selectable object including an address such as a universal resource locator, an Internet Protocol address, a network address, a MAC address, a QR code, a telephone number, a File Transfer Protocol address, a UDP address, an FTP address, a file path, a script, a short cut, and/or the like. Selection of a link results in retrieval and/or execution of content addressed by the link. In a specific example, a link includes a universal resource locator convertible to an internet protocol address using IP/TCP protocols. Retrieval of content from the internet protocol address, optionally results in redirection to a different address. For example, selection of a link may result in retrieval of content/data from a first addressed location and this content/data may include a different address to a second location to which the process is redirected. In a specific example, a link can include a URL to a redirection website, which is configured to redirect a selection to a specific location within the Apple App Store or Google Play. The HyperKey Chat 2.0 application can be downloaded from this location.

Referring again to FIG. 1, Computing Device 110A optionally further includes Upload Logic 167 configured to transfer a log of shared data to external devices via Network 115. For example, Upload Logic 167 may be configured to upload a log of data shared from Computing Device 110A by providing an output of Dependent Application 125A to an input field of Base Application 120A and using Base Application 120A to send the data (or a link thereto) to Computing Device 110B or any other device configured to execute Base Application 120A. The transferred log may be generated using Logging Logic 166 and is optionally transferred to and/or via Server 195. The log may be transferred one record at a time or in batches of records, each record representing a data sharing event. The log typically, but not necessarily, include metadata associated with shared objects/data. The operation of Upload Logic 167 may be automatic, not requiring additional user input beyond the act of sharing the data.

Computing Device 110A optionally further includes Setup Logic 160 configured for a user to subscribe to one or more external logs. This selection is typically made from a plurality of external logs generated at a plurality of separate remote devices. In various embodiments, Setup Logic 160 includes a selection menu configured for selecting logs generated by well-known persons, logs generated members of the user's social networks, logs generated by users with whom the users have shared data using the systems and methods described herein, logs of popular data, and/or the like. Setup Logic 160 is optionally configured to suggest logs to a user based on the user's profile. As used herein, the term "external log" is meant to refer to a log that is generated on a device external to the current member of Computing Devices 110. For example, a log that is generated on Computing Device 110B or Server 195.

Computing Device 110A optionally further includes Download Logic 168 configured to download one or more external logs to which a user has subscribed, to Computing Device 110A. The one or more external logs include data transferred between virtual user interfaces on remote computing devices. For example, these external logs can include logs generated by Logging Logic 166 as described elsewhere herein. These external logs are provided as an input stream to Computing Device 110A.

Figure 11:
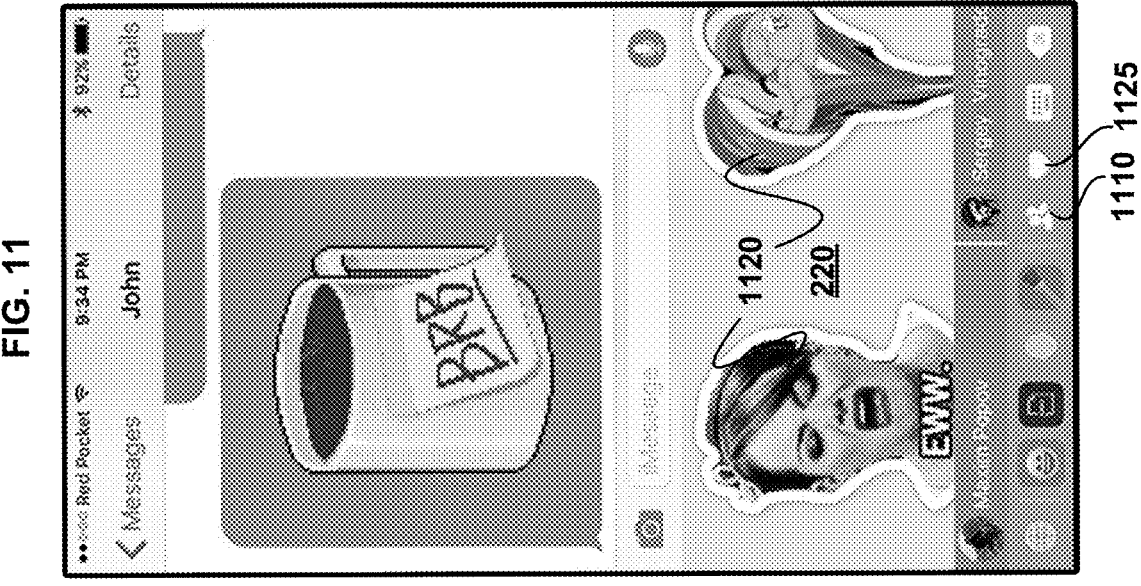
FIG. 11 illustrates an adapted user interface including a short-cut key configured to access a log of transferred/shared data, according to various embodiments of the invention.

In some embodiments, Adapted User Interface 220 includes a short-cut key to an instance of Dependent Application 125 specifically configured for accessing the input stream including one or more external input logs, and/or logs generated locally on Computing Device 110A. For example, FIG. 11 illustrates an Adapted User Interface 220 including a Stream Short-cut Key 1110 configured to access logs of transferred/shared data, according to various embodiments of the invention. In the example shown, the logs can include logs generated locally and/or external logs to which the user has subscribed. In the illustrated example, Fields 1115 configured to show two different external logs are shown. Also shown are two Gifs 1120 in the user's internally generated log of shared data. The example illustrated in FIG. 11 also includes a Short-cut Key 1125 configured to show shared data from logs that the user has indicated as being favorites (e.g., the user has liked).

Some embodiments of Computing Device 110A further include Analysis Logic 169. Analysis Logic 169 is configured to generate user profile data based, at least in part, on the user's Log 1130, keystrokes typed by the user, and/or search terms entered by the user. For example, a user's profile may include a summary of the type of content the user likes based on tags, search terms, and/or characterizations of shared data within the user's Log 1130. The profile can be based on searches performed, shared object type, tags provided by other users, tags provided using image recognition, shared object classification, likes of shared data, and/or the like. Analysis Logic 169 can be located on Computing Device 110A and/or Server 195. Likewise, the user profile generated using Analysis Logic 169 can be stored in Storage 165 and/or a Storage 197 of Server 195. In an illustrative example, Analysis Logic 169 may be used to note that the user often uses or searches for objects related to love and relationships, or that the user often likes objects in external logs related to video games. These observations can be noted in the user's profile as factors characterizing the user.

In some embodiments, Computing Device 110A includes Advertising Logic 162. Advertising Logic 162 is configured to select advertisements for presentation to a user of Computing Device 110A on Display 130. The selection can be based on a wide variety of factors including a user's profile, location information, the identity of Base Application 120A and/or Dependent Application 125, the identity of shared data, content of text messages and/or other communications, information provided by the user (e.g., age, gender and interests), and/or the like. For example, advertisements may be selected based on an analysis of shared data performed using Analysis Logic 169. Advertisements may be inserted in a log of shared data, in an input stream received from a device external to Computing Device 110A, in search results, and/or presented elsewhere on a virtual user interface. For example, in some embodiments an advertisement includes text, an image included in a shared data log, and/or an advertising shortcut key on a virtual keyboard. In some embodiments, advertisements are included in an instance of Log 1130 that is shared to other Computing Devices 110 using Upload Logic 167. In some embodiments, advertisements are included in search results obtained in response to sending search terms to a remote API. These advertisements may be displayed within search results obtained from one or from two or more applications.

The advertisement is typically configured for accessing further advertising content when selected. The further advertising content can include, for example, a web resource, images, audio, video, websites, etc. The advertisement may be configured for executing a local or remote application, opening a browser to a specific URL, opening a download site, and/or the like. The advertisement may be presented within a virtual keyboard. Advertising Logic 162 is optionally configured to select the functionality of an advertisement, i.e., the action(s) taken when the advertisement is selected. The functionality may be dependent on information within the user's profile.

In some embodiments Advertisement Logic 162 is configured to select advertisements based on data stored on Computing Device 110A. This feature can be used to preserve privacy. For example, the content of text messages or e-mail may be considered too private to communicate to Server 195. In this case, Advertisement Logic 162 may use this private information on Computing Device 110A to select between alternative advertisements already present on Computing Device 110A, without unnecessarily communicating the private information from Computing Device 110A.

Advertisement Logic 162 is optionally configured to retrieve and add an advertisement to displayed search result, including displayed search result including results from a global search that includes results from several applications displayed together. The advertisement in this case are optionally selected based on a search term(s) used to perform a global search and/or an advertising bidding system.

In some embodiments, advertisements are provided from Server 195, or some other remote location, to Computing Device 110A in an encrypted form. The advertisements are then decrypted on Computing Device 110A prior to presentation to a user on Display 130. The decryption may make use of a public/private key pair and may serve to both authenticate and prevent unauthorized corruption of advertisements.

Figures 12, 13:
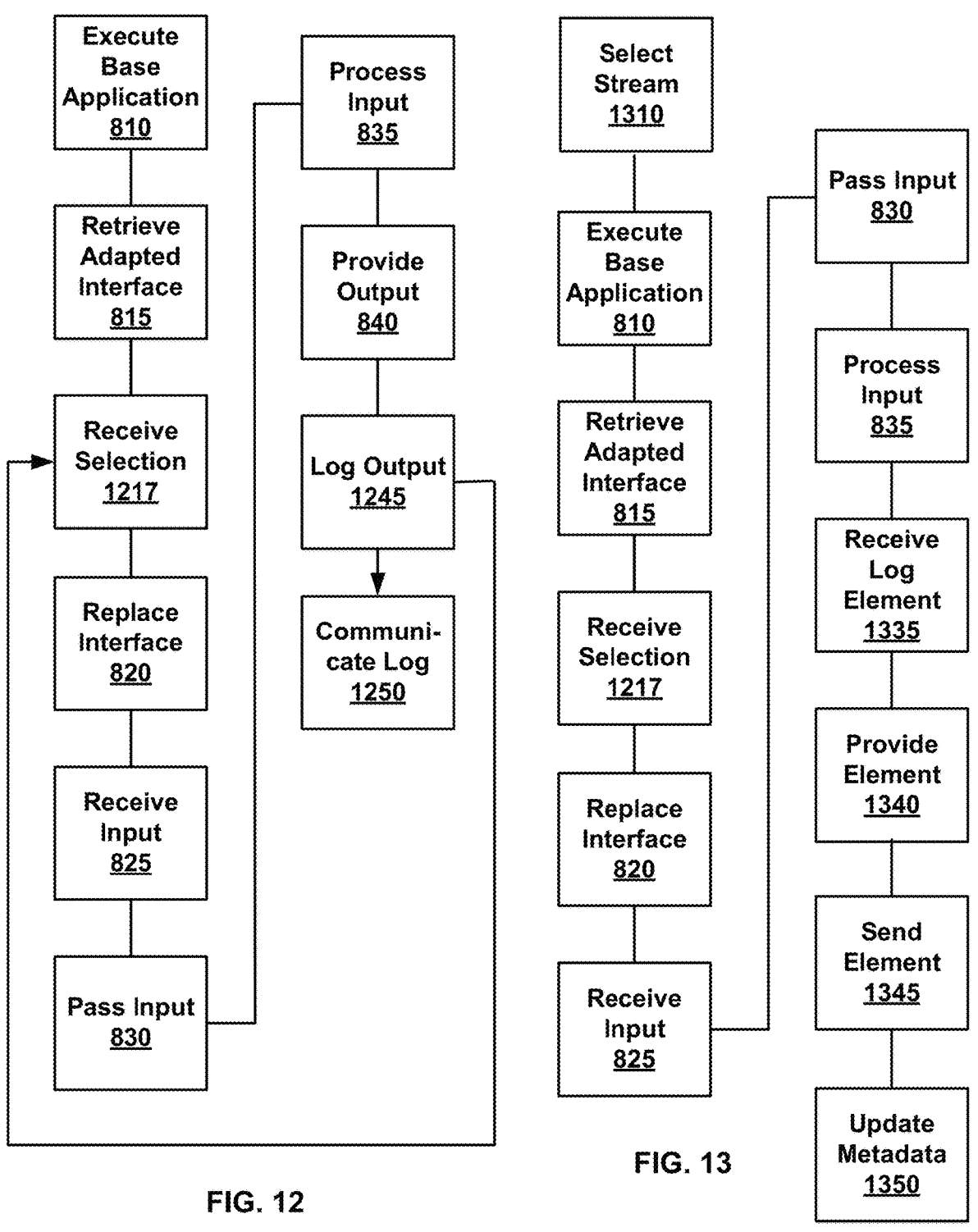
FIG. 12 illustrates methods of creating a log, according to various embodiments of the invention.
FIG. 13 illustrates methods of receiving logs, according to various embodiments of the invention.

FIG. 12 illustrates methods of creating a log, according to various embodiments of the invention. The log is created by sharing content using Base Applications 120 and Dependent Applications. Execute Base Application 810, Retrieve Adapted Interface 815 are executed as described elsewhere herein. In a Receive Selection 1217 a selection of a shortcut key is received. The selected shortcut key is a member of a plurality of shortcut keys included in a first user interface displayed in a base application. The selection is typically made by a user touching Display 130 or clicking using a mouse.

Replace Interface Step 820, Receive Input Step 825, Pass Input Step 830, Process Input Step 835 and Provide Output Step 840 are executed as described elsewhere herein. In Provide Output Step 840 the output of a member of Dependent Applications 125 is provided to an input field of one of Base Applications 120.

In a Log Output Step 1245 the provided output and optionally any associated metadata is placed in Log 1130. The log is optionally stored in Storage 165 or Storage 197. If this is the first entry in Log 1130 then Log Output Step 1245 may include creation of the log. For example, Log 1130 may include data representative of the output of Dependent Application 125A. Log 1130 may include data representing outputs of multiple members of Dependent Applications 125, each of the outputs having been provided to the input field of one of Base Applications 120

Steps 1217 through 1245, and the entire method illustrated, are optionally repeated to add further entries to Log 1130. The steps may be repeated with different members of Base Applications 120 and/or Dependent Applications 125.

In an optional Communicate Log Step 1250, Log 1130 is communicated to one or remote devices using I/O 170 and Network 115. The remote devices can include Computing Device 110B and/or Server 195.

FIG. 13 illustrates methods of receiving External Logs 1140, according to various embodiments of the invention. A user can select which of External Logs 1140 they wish to subscribe to. The External Logs 1140 can include logs generated at other members of Computing Devices 110 and/or logs generated at Server 195. The logs generated at Server 195 may be generated and managed by Stream Management Logic 196. They may include the most popular elements within user generated logs, logs of objects selected based on a classification, logs based on special events, logs configured for use in a specific geographic region, and/or the like. The External logs optionally include advertisements inserted by Stream Management Logic 196.

Execute Base Application 810, Retrieve Adapted Interface Step 815, Receive Selection Step 1217, Replace Interface Step 820, Receive Input Step 825, Pass Input Step 830 and Process Input Step 835 are executed as described elsewhere herein.

In a Receive Log Element Step 1335 data representative of an object within one of the selected External Logs 1140 is received in response to processing in Process Input Step 835. This data optionally becomes an output of one of Dependent Applications 125.

In a Provide Element Step 1340, the data/object received in Receive Log Element Step 1135 is provided to an input field of one of Base Applications 120A.

In a Send Element Step 1345 the data/object is sent to a remote computing device such as Computing Device 110B and/or Server 195 using the communication features of Base Application 120A or 120B.

In an Optional Update Metadata Step 1350, metadata associated with the data/object is updated. The update can occur on Computing Deice 110A and/or Server 195. For example, in some embodiments, Update Metadata Step 1350 includes sending an update counter command from Computing Device 110A to Server 195. At Server 195 the command is used to update a count of how often the data/object has been shared. Update Metadata Step 1350 may occur before the object is sent or provided in Steps 1340 or 1345.

In various embodiments, one or more of Dependent Applications 125 discussed herein are configured to engage in two-way communication with a chatbot. This engagement can be accomplished in two (not necessarily exclusive) ways. In some embodiments, Dependent Application 125A is configured to communicate directly with a remote chatbot. For example, Dependent Application 125A can include Messaging Logic 198 configured for sending and receiving messages to a chatbot. This Messaging Logic 198 may be configured to support SMS (Short Message Service), MMS (Multimedia Messaging Service), EMS (Enhanced Messaging Service), RCS (Rich Communication Services), and/or other messaging standards. The messages received from the chatbot can include graphics such as buttons, images, and/or other user interface elements. In some embodiments Messaging Logic 198 includes voice-to-text or text-to-voice logic configured to support audio communication with the chatbot. In some embodiments, Dependent Application 125A is configured to communicate to a chatbot via Base Application 120A. In these embodiments, Messaging Logic 198 is optionally configured to initiate a new conversation within Base Application 120A. This new conversation is optionally a three-or-more-party conversation including two or more human users and the chatbot.

Figure 14:
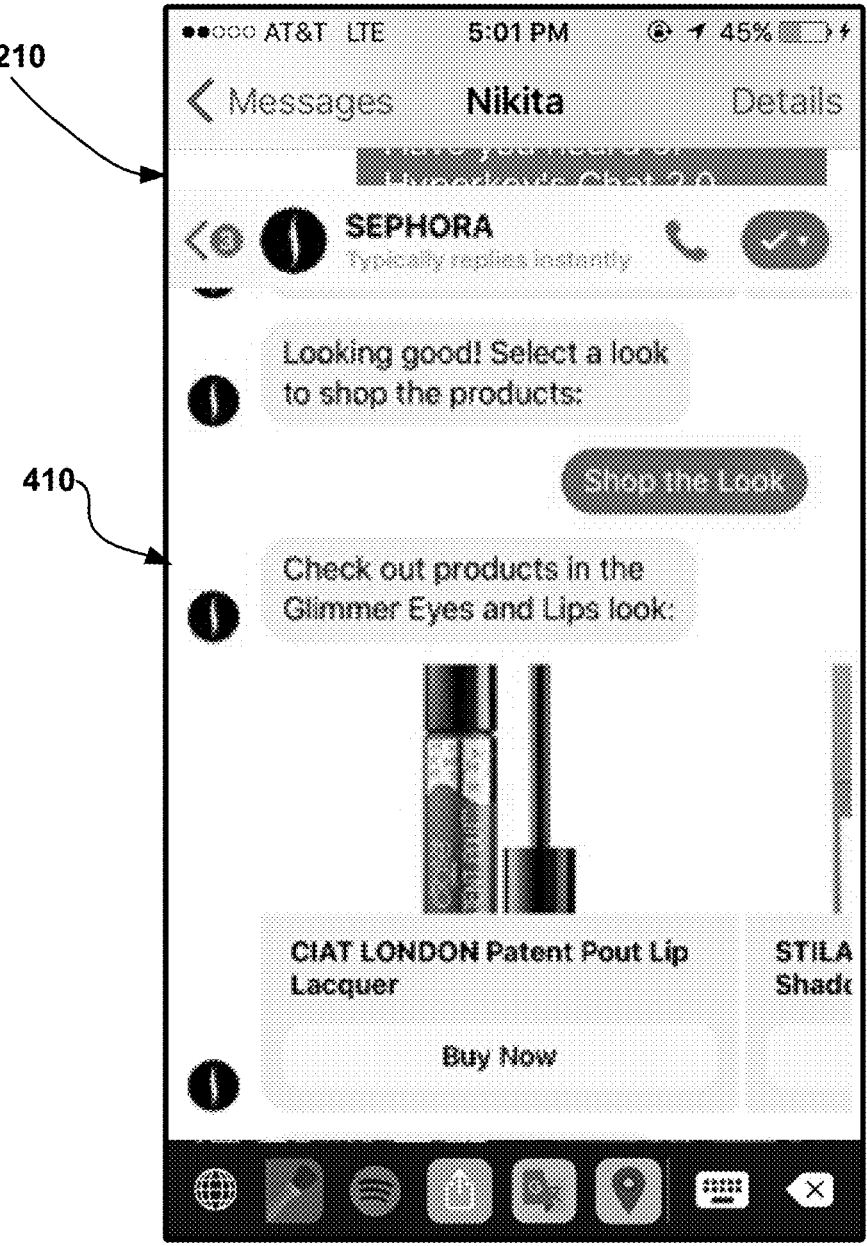
FIG. 14 illustrates an example of a dependent application including a messaging application configured to communicate with a chatbot, according to various embodiments of the invention.

FIG. 14 illustrates an example of Dependent Application 125A including a messaging application configured to communicate with a chatbot. The dialog between a user and the chatbot is included in part of the interface to Dependent Application 125A which covers all or part of the adapted interface to Base Application 120A. The user has entered text "shop this look" and the chatbot has responded with an image, text and a button labeled "buy now". Most, but not all, of the interface to Base Application 120A (iMessage) is covered by the interface to Dependent Application 125A (a Sephora® chatbot). The interface to the Sephora chatbot has been evoked (e.g., executed) using a shortcut key on the adapted interface to Base Application 120A.

Optionally, the user can transfer all or part of the dialog with the chatbot to a text input field of Base Application 120A. For example, Dependent Application 125A may be configured to transfer (share) an image, text, an address (e.g. URL), and/or a link from the dialog to the text input field. Dependent Application 125A is optionally configured to share product links to the text input field of Base Application 120A. These product links may be configured for purchasing products. The interface of Dependent Application 125A optionally includes controls configured to select particular elements of the dialog to transfer. As noted elsewhere herein, Base Application 120A may be a text messaging or e-mail application. As such, Messaging Logic 19 is configured for executing a messaging based interface within an interface to a separate text messaging application.

Alternatively, Dependent Application 125A and/or Dependent Application 125A may be configured to communicate with or initiate communication with a chatbot via Base Application 120A and for the dialog of the chatbot to be displayed in Base Application 120A. In this case, the dialog may be initiated to be between just the user and the chatbot or be between the user, the chatbot and a third-party.

For example, in some embodiments, the logic of Dependent Application 125A may be configured to initiate a new messaging session within Base Application 120A, wherein the new messaging session is between the chatbot and Base Application 120A. The logic of Dependent Application 125A is optionally configured to provide a telephone number or other identifier (e.g., Universal Resource Locator or Internet Protocol address) of a communication endpoint of the messaging session to Base Application 120A. Base Application 120A is optionally configured to initiate a messaging session with the chatbot using this identifier.

In the embodiments illustrated by either FIG. 14, Messaging Logic 198 is configured to initiate the communication with the chatbot can be executed by clicking on a shortcut key disposed with an adapted user interface of the base application. Specifically, a shortcut key included in an adapted interface of the base application can include a plurality of shortcut keys, one or more of these shortcut keys being configured to initiate or resume a conversation with a chatbot. A particular shortcut key may be dedicated to communications with a particular chatbot, or a shortcut key may be configured for a user to select between alternative chatbots with which the dependent and/or base applications may be used to communicate.

The communication between the user and the chatbot is optionally based on a custom set of protocols. For example, the communication can be limited to a specific set of functionality. In one case, the communication is limited to images, predesignated text, and/or buttons configured to perform specific functions.

As used herein, the term "chatbot" is used to specifically refer to an automated response system configured to receive an image, a command, text or verbal data and to provide an automated response as part of a dialog in which multiple data are received and multiple responses are provided in series. The responses can include text, images, functional objects, and/or audio. For example, a chatbot may be configured to provide "button" including a graphic or text and logic configured to return specific data to the chatbot. Chatbots can include hard coded or artificial intelligence logic configured to select and/or generate the responses.

Many of the dependent applications associated with shortcut keys of the keyboard include functionality that includes searching for content based on a keyword. For example, one may separately search "pizza" in either Tenor or Yelp to obtain desired content from these applications. In some embodiments, Search Logic 173 and User Interface Logic 172 are configured for a user to perform a "global search" in which the same search term is used to perform parallel searches across multiple apps. For example, in a global search, the term "pizza" can be used to perform a single search request that retrieves results from both Tenor and Yelp applications. Specifically, the single search request includes a single entry of the search term in the text entry field and a single request to do the search. The single search request results in multiple searches being made to multiple third-party applications. In some embodiments each of these multiple searches is performed using a separate API call to third-party APIs.

Figures 15A, 15B:
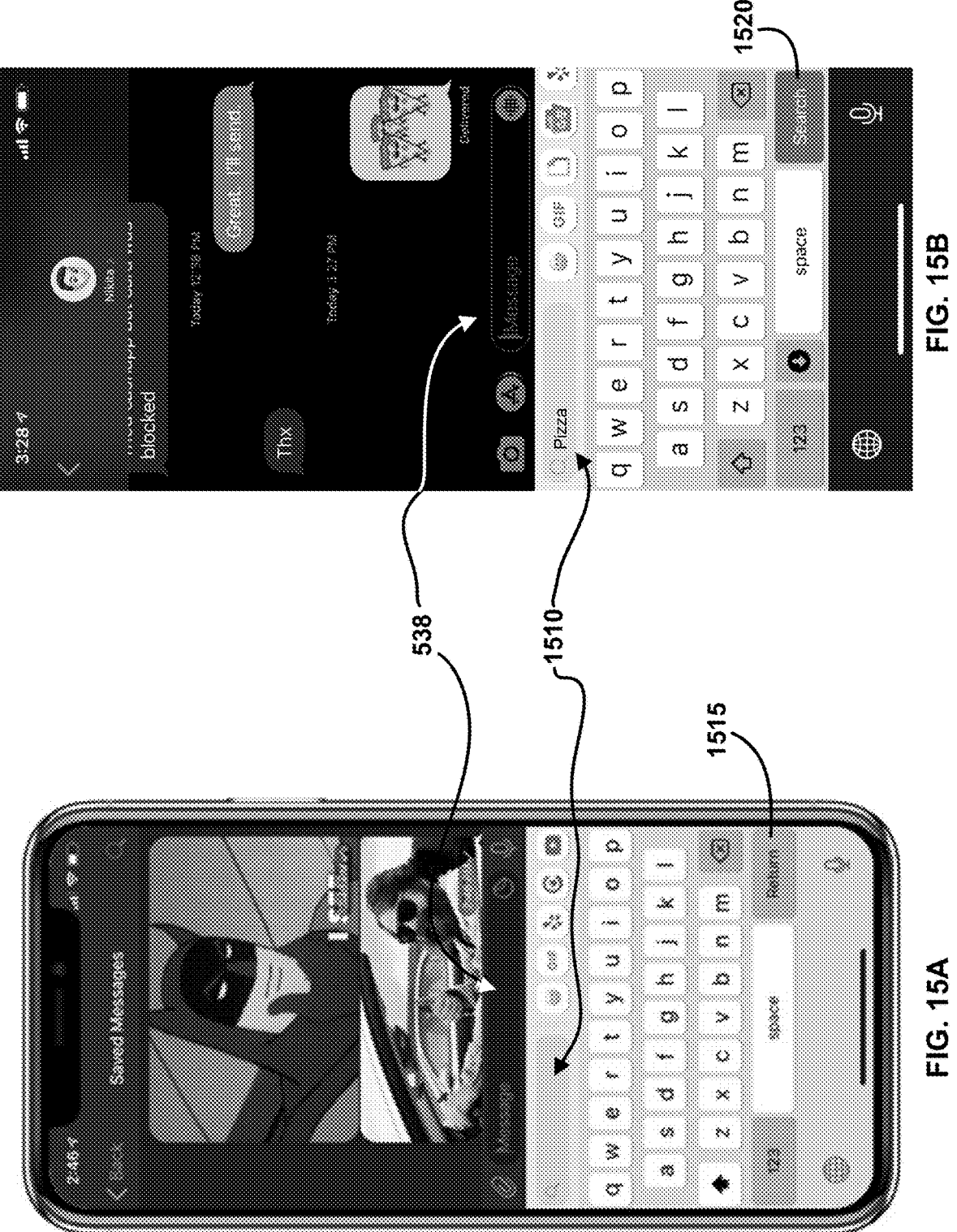
FIG. 15A illustrates a virtual keyboard including a second text input field, according to various embodiments of the invention.
FIG. 15B illustrates a global search control within a virtual keyboard, according to various embodiments of the invention.

FIG. 15A illustrates a virtual keyboard including a Second Text Input Field 1510, according to various embodiments of the invention. Second Text Input Field 1510 is a second text input field in addition to Input Field 538 of Base Application 120A. Second Text Input Field 1510 is configured to receive one or more search terms for the performance of single application and/or global searches. In some embodiments, Keyboard Logic 163 is configured to automatically add search terms to Second Text Input Field 1510 responsive to text or other content entered by a user in Input Field 538. For example, if predetermined keywords are typed into Input Field 1510, Keyboard Logic 163 may be configured to automatically copy these keywords into Second Text Input Field 1510. This can occur in real-time as the user is typing. If another keyword is typed this keyword can replace the first keyword in Second Text Input Field 1510. Second Text Input Field 1510 is optionally configured to receive content other than text, for example, images.

FIG. 15B illustrates a Global Search Control 1520, e.g. a global search button, within a virtual keyboard, according to various embodiments of the invention. The "Return" Button 1515 of FIG. 15A is automatically converted into a Global Search Control 1520 once text is entered in Second Text Input Field 1510. Once text is entered in Second Text Input Field 1510 the one or more words of the text can be used as search term(s) for a single application search by selecting one of the shortcut keys (e.g., Shortcut Icons 225) or for a global search by selecting the Global Search Control 1520.

Figure 15C:
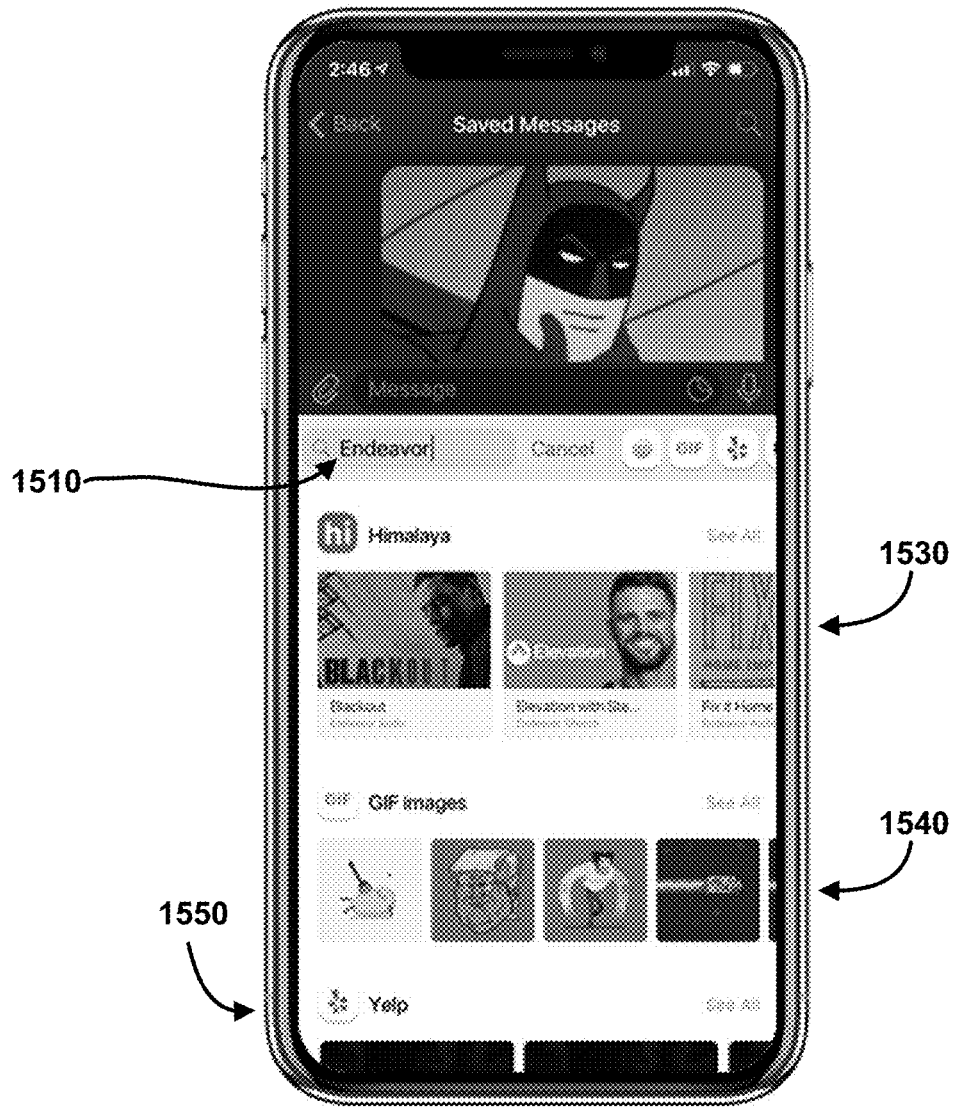
FIG. 15C illustrates results of a global search from within a virtual keyboard, according to various embodiments of the invention.

FIG. 15C illustrates results of a global search from within a virtual keyboard, according to various embodiments of the invention. In this case, the search term "Endeavor" has been used to search three different external applications at the same time. Results are show together for the Himalaya podcast app (1530), GIF (1540), and Yelp (1550). Results for a specific application can be browsed by swiping horizontal. Results for different applications can be browsed by swiping vertically. Any of the results can be copied into Input Field 538 and communicated using Base Application 120A.

Figure 16:
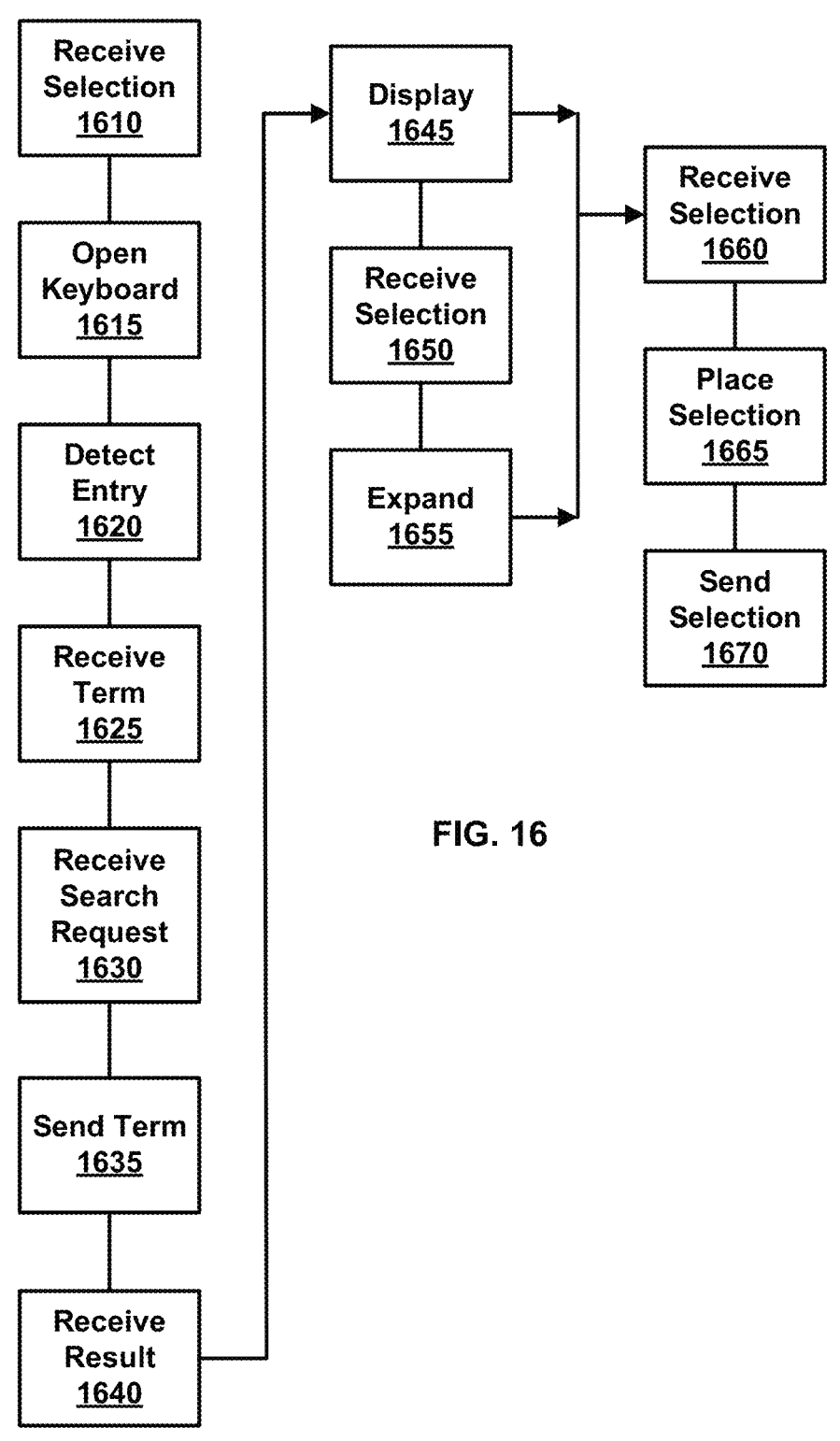
FIG. 16 illustrates a method of performing a search within a virtual keyboard, according to various embodiments of the invention.

FIG. 16 illustrates a method of performing a search within a virtual keyboard, according to various embodiments of the invention. The search is optionally a global search in which multiple dependent applications 125 are searched in parallel using Search Logic 173 and the results are shown together on Display 130 using Display Logic 148. Alternatively, the search may be a single application search in which a shortcut key is used to search on one or more search terms already typed into a text input field. In some embodiments, the search terms are automatically extracted from messages or other contact entered by a user in a text field of a messaging application.

In an optional Receive Selection Step 1610, a selection is received of at least a first application and a second application, e.g., two or more applications, for the purposes of determining which applications should be included in a global search wherein multiple applications are searched at once. This selection may occur in a setup menu managed by Setup Logic 160. In typical embodiments, 2, 3, 4 or more applications may be selected. Receive Selection Step 1610 is optional in embodiments wherein there is a default set of applications to include in a global search.

In an Open Keyboard Step 1610, a keyboard is opened within Base Application 120. For example, a keyboard may be opened in a messaging application that includes a first text input field configured to receive keystrokes from the keyboard. The opened keyboard optionally includes a second text input field. See, for example, Input Field 538 and Second Text Input Field 1510 of FIGS. 15A & 15B. Optionally, the keyboard includes a shortcut key to the first selected application, a shortcut key to the second selected application, and/or a global search key.

In an optional Detect Entry Step 1620, entry of a keyword is detected in the first text input field. Typically, this entry is via the keyboard. The keyword may be one of a set of predetermined keywords and may be managed by Advertising Logic 162. Following detection of a keyword, the keyword may automatically be highlighted and/or transferred to the second text input field.

In a Receive Term Step 1625, one or more search terms are received within the second text input field. The search terms may be automatically placed within the second text input field as a result of Detect Entry Step 1620 or may be manually provided the second text input field by a user using the keyboard.

In a Receive Search Request Step 1630, a selection of the global search control is received. For example, a user may select Global Search Control 1520. In some embodiments, Global Search Control 1520 is configured to automatically appear in response to detection of entry of a keyword in Detect Entry Step 1620 and/or in response to receipt of a search term in Receive Term Step 1625.

Alternatively, in Receive Search Request Step 1630, a selection of a shortcut key, e.g., one of Shortcut Icons 225, is received rather than receiving a selection of the global search control. In this event a single application search is performed using the respective member of Dependent Applications 125.

In a Send Term Step 1635, the search term(s) received in Receive Term Step 1625 is sent to multiple applications, e.g., the first and second applications, in a request to receive search results from each of the multiple applications. Optionally the search terms are sent to application programming interfaces (APIs) supported by publishers of each of multiple third-party applications, via the Internet. For example, a search term "pizza" may be sent to cloud-based APIs of Tenor, Yelp and YouTube. Send Term Step 1635 is optionally performed in response to receiving the selection of the global search control in Receive Search Request Step 1630.

In a Receive Result Step 1640, a first search result is received from the first application, and at least a second search result is received from the second application. Search results from more than two remote third-party applications may be received in this step.

In a Display Step 1645, the search results received in Receive Result Step 1640 are displayed together in Display 130. They are optionally displayed together within space previously used to display the keyboard. For example, both the first and second search result together within the keyboard space as illustrated in FIG. 15C.

In an optional Receive Selection Step 1650, selection of the shortcut key to the first application is received while both the first and second search result are displayed within the keyboard. In response, in an optional Expand Step 1655, the area within which search results of the first application are displayed is expanded and additional search results from this application are displayed. Alternatively, Receive Selection Step 1650 includes receiving a screen swipe over the results from the first application, and Expand Step 1655 includes moving more search results from that application into view.

Display Step 1645, Receive Selection Step 1650 and Expand Step 1655 optionally include managing one or more caches of search results from each of the applications searched in memory. This memory may be keyboard memory.

In an optional Receive Selection Step 1660, a selection of an item within the first search results is received. For example, a user may select a Yelp search result by clicking or touching a screen.

In an Optional Place Selection Step 1665, the item selected in Receive Selection Step 1660 is placed within the first text input field, in response to the selection of the item.

For example, a Yelp result selected in the displayed results may be copied to the first text input field.

In an optional Send Selection Step 1670, the selected item is sent from the first text input field as part of a message to a remote party via a messaging application.

Figure 17:
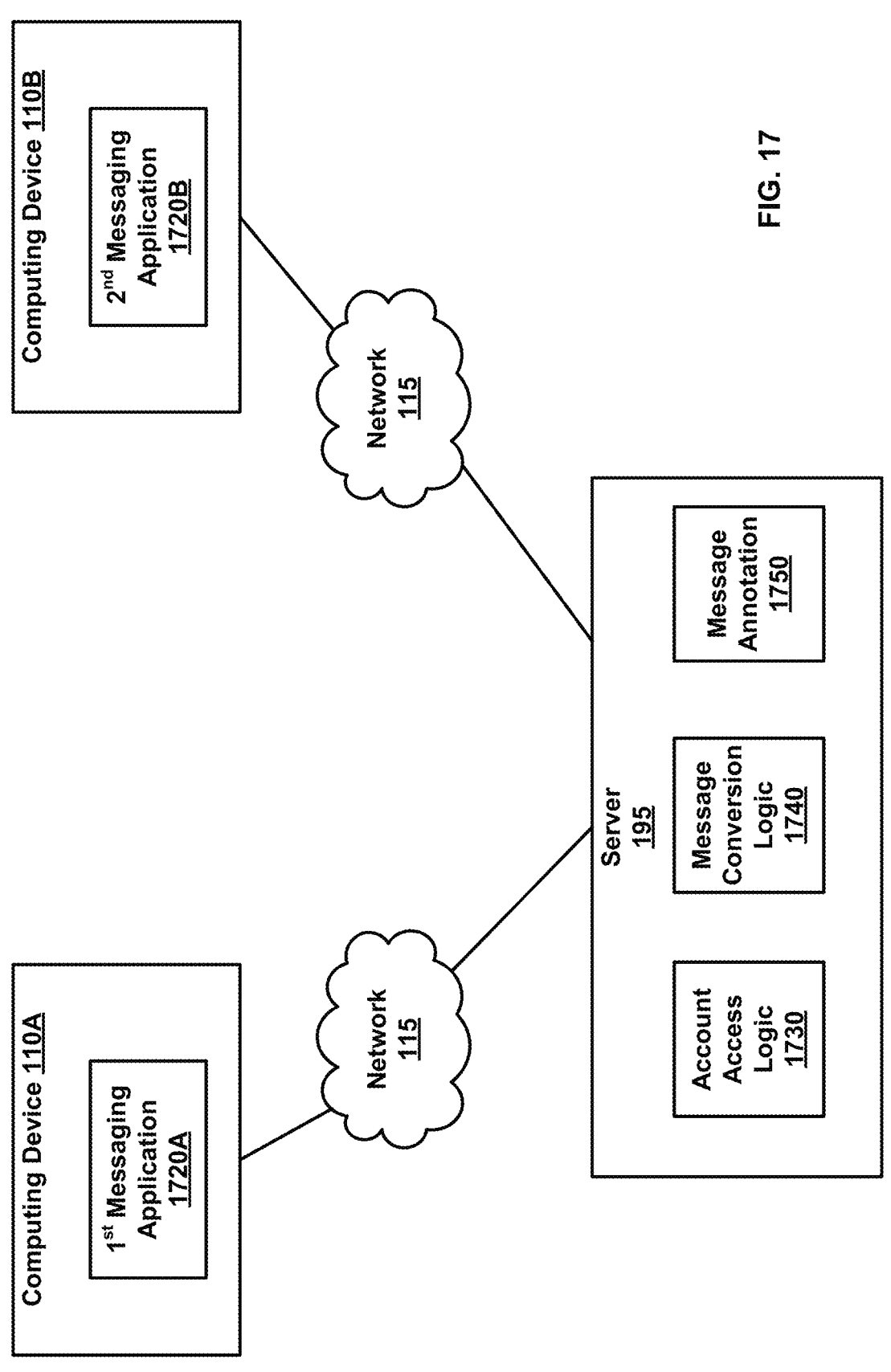
FIG. 17 illustrates a multiplatform messaging system, according to various embodiments of the invention.

FIG. 17 illustrates a multiplatform messaging system, according to various embodiments of the invention. This system is configured for users to communicate with each other, each using a different messaging application. Optionally, the system illustrated in FIG. 17 can also be used to add additional functionality to messages passed between the same and/or different messaging applications.

In the embodiments illustrated in FIG. 17, Server 195 is configured to relay messages between Computing Device 110A and Computing Device 110B. In addition to merely relaying messages, Server 195 may convert messages from one messaging protocol to another messaging protocol, e.g., from iMessage to FaceBook messenger. This allows a message to be sent by a first user using a first messaging application and received by a second user using a second messaging application. In addition to conversion of messages between protocols, Server 195 may be configured to add new functionality to messages. For example, messages may be annotated or sharing of communicated content may be tracked and/or rewarded.

For simplicity, the Server 195 and the Computing Devices 110 without the elements illustrated in FIG. 1. However, the embodiments illustrated may have any or all of the elements taught as being included therein in FIG. 1 or elsewhere herein.

The Computing Devices 110A and 110B shown in FIG. 17 include 1$^{st}$ Messaging Application 1720A and 2$^{nd}$ Messaging Application 1720B, respectively. 1$^{st}$ Messaging Application 1720A and 2$^{nd}$ Messaging Application 1720B may be the same or different messaging platforms. For example, 1$^{st}$ Messaging Application 1720A may be FaceBook messenger and 2$^{nd}$ Messaging Application 1720B may be iMessage. Alternatively, 1$^{st}$ Messaging Application 1720A and 2$^{nd}$ Messaging Application 1720B may both be the WeChat messaging application. Computing Devices 110A and 110B may each include multiple different messaging applications, configured to communicate over proprietary platforms. 1$^{st}$ Messaging Application 1720A and 2$^{nd}$ Messaging Application 1720B are examples of Base Applications 120.

As shown in FIG. 17, Server 195 optionally includes Account Access Logic 1730. Account Access Logic 1730 is configured to log into one or more messaging account of a user, using credentials of the user. For example, Account Access Logic 1730 may be used to log into both Facebook and Signal accounts of a user of Computing Device 110A.

Server 195 optionally includes Message Conversion Logic 1740 which is configured to automatically convert messages from a first messaging protocol to a second messaging protocol, and to forward the converted message to a destination.

Message Annotation Logic 1750 which is configured for annotating messages. For example, Annotation Logic 1750 may add tracking logic to a message, add a "like" button to a message, encrypt a message, and/or the like. Specifically, Message Annotation Logic 1750 may be configured to track a link sent from a first user to a second user such that the first user can be rewarded if the second user forwards the link.

Several embodiments are specifically illustrated and/or described herein. However, it will be appreciated that modifications and variations are covered by the above teachings and within the scope of the appended claims without departing from the spirit and intended scope thereof. For example, while a messaging application is illustrated in some of the examples provided, the concepts disclosed can be applied to other types of application including those in which a default interface is not a keyboard interface. The data discussed here in can include a wide variety of data including text data, binary data, image data, metadata, audio data, formatting data, command data, and/or the like. Various embodiments of the invention include a server configured to provide software to remote devices, the software comprising any combination of the various logic disclosed herein. In alternative embodiments, any or all of the logic taught herein to be disposed on Computing Device 110A is disposed on Server 195.

The discussion herein regarding games may also apply to any other group activities. For example, group editing sessions, conferences/chats, auctions, image sharing, content sharing, and/or the like. Further, the self-propagation of applications by sharing a link configured to provision that application on a remote computing device is not restricted to sharing using a virtual keyboard or Adapted User Interface 220. Specifically, an application may itself be configured to send a link via an instance of Base Application 120A to a remote device, the link being configured for provisioning the application on the remote device. While many of the examples provided herein include input fields of Base Application 120A that are configured to receive text data, in alternative embodiments, the inputs provided to Base Application 120A can include images, video, audio, and/or other data types.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The logic discussed herein includes hardware, firmware and/or software stored on a non-transient computer readable medium. This logic may be implemented in an electronic device to produce a special purpose computing system.

The invention claimed is:

1. A mobile device comprising:

a display;

keyboard logic configured to present a virtual keyboard within the display;

a messaging application including a first text input field configured to receive keystrokes entered by a user from the virtual keyboard;

user interface logic configured to present a user interface within the keyboard while the first text input field is displayed, the user interface including a second text input field;

search logic configured to receive one or more search terms from the second text input field, to send the search term(s) to at least two different applications in response to a single search request, and to automatically receive search results from at least two third-party applications based on the single search request; and display logic configured to display the search results within the keyboard on the mobile device.

2. The device of claim 1, wherein the virtual keyboard includes a plurality of shortcut keys configured to execute the at least two different applications within the keyboard.

3. The device of claim 2, wherein the shortcut keys are each configured to send the search term(s) to a different respective member of the at least two different applications.

4. The device of claim 2, wherein the shortcut keys are each configured to perform a single application search on a single associated member of the at least two different applications in response to a single search request.

5. The device of claim 2, wherein the shortcut keys are each configured to display a different interface to a respective member of the at least two different applications within the keyboard.

6. The device of claim 2, wherein the shortcut keys are each configured to display a different interface to a respective member of the at least two different applications within the keyboard if the second text input field is empty and, in the alternative, to initiate a single application search on the respective member of the at least two different applications if the second text input field includes a search term.

7. The device of claim 6, wherein each different interface includes a text input field of the respective member of the at least two different applications.

8. The device of claim 1, wherein the user interface includes a control configured to perform a global search at the at least two different applications, the global search including communicating the search term(s) to the at least two different applications.

9. The device of claim 8, wherein the at least two different applications are third-party applications, and the search logic is further configured to access the third-party applications over a computer network and an application programming interface, and further configured to receive search results from the at least two third-party applications via the computer network in response to the single search request.

10. The device of claim 1, wherein the display logic is configured to display the results from the at least two different applications together in a same window.

11. The device of claim 10, wherein results of a first of the at least two different applications are displayed in a group separate from results of a second of the at least two different applications, an order of the groups within the same window being dependent on an identity of the search term(s).

12. The device of claim 10, wherein the display logic is configured to display an advertisement in the same window, along with the results from the at least two different applications, the advertisement optionally being selected based on the search term(s).

13. The device of claim 10, wherein the display logic is configured to scroll in a first direction to view search results from additional applications, and to scroll in a second direction to view additional search results from one of the at least two different applications.

14. The device of claim 10, wherein the display logic is configured to manage memory available for the display of search results using: 1) a cache of search results from a first of the at least two different applications, and 2) a cache of search result from a second of the at least two different applications.

15. The device of claim 10, wherein the display logic is configured to display a control configured for a user to expand display of search results from a particular member of the two different applications.

16. The device of claim 1, further comprising data transfer logic configured to transfer the search results displayed within the keyboard to the first text input field of the messaging application.

17. The device of claim 16, wherein the data transfer logic is configured to place a link in the first text input field.

18. The device of claim 17, wherein the link is configured to download one of the two different applications.

19. The device of claim 17, wherein the link is configured to download the display logic.

20. The device of claim 1, wherein the display logic is configured to display an adapted interface of one of the at least two different applications within space occupied by the virtual keyboard.

21. The device of claim 1, further comprising setup logic configured for a user to select which applications to include in the at least two different applications.

22. The device of claim 1, further comprising advertising logic configured to add an advertisement to the displayed search results, the advertisement being selected base on the one or more search term(s).

23. The device of claim 1, further comprising term detection logic configured to detect entry of keywords into the first text input field via the keyboard; and further comprising storage configured to store a set of keywords on the mobile device, wherein the user interface logic is configured to transfer keywords detected as entered in the first text input field to the second text input field, and, wherein the term detection logic is configured to compare keystrokes entered into the first text input field to predetermined keywords, and provide keywords that match the keystrokes to the user interface for copying to the second text input field.

* * * * *